US012613565B2

(12) United States Patent (10) Patent No.: US 12,613,565 B2
Kaburlasos (45) Date of Patent: Apr. 28, 2026

(54) CONTROLLING A POWER CONSUMPTION OF CIRCUITRY

(71) Applicant: Intel Corporation, Santa Clara, CA (US)

(72) Inventor: Nikos Kaburlasos, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 18/575,238

(22) PCT Filed: Sep. 22, 2021

(86) PCT No.: PCT/US2021/051470
§ 371 (c)(1),
(2) Date: Dec. 28, 2023

(87) PCT Pub. No.: WO2023/048709
PCT Pub. Date: Mar. 30, 2023

(65) Prior Publication Data
US 2024/0310889 A1 Sep. 19, 2024

(51) Int. Cl.
G06F 1/26 (2006.01)
G06F 1/3212 (2019.01)
(Continued)

(52) U.S. Cl.
CPC ............ G06F 1/263 (2013.01); G06F 1/3212 (2013.01); G06F 1/3215 (2013.01); G06F 1/3234 (2013.01)

(58) Field of Classification Search
None
See application file for complete search history.

(56) References Cited

U.S. PATENT DOCUMENTS

2002/0073351 A1* 6/2002 Oh .......................... G06F 1/263
713/500
2006/0288243 A1 12/2006 Kim
(Continued)

FOREIGN PATENT DOCUMENTS

JP 2015-049636 A 3/2015
JP 2015-125623 A 7/2015
KR 10-2009-0084255 A 8/2009

OTHER PUBLICATIONS

International Search Report and Written Opinion mailed Jun. 9, 2022 for International Application No. PCT/US2021/051470, 10 pages.
(Continued)

*Primary Examiner* — Paul Yen
(74) *Attorney, Agent, or Firm* — Schwabe, Williamson & Wyatt, P.C.

(57) ABSTRACT

An apparatus for managing a power consumption of processor or memory circuitry comprising a plurality of processing or memory functional units may be provided. The processor or memory circuitry is arranged to receive electrical power from an alternating current, AC, power source or a battery. The apparatus comprises processing circuitry to: based on an indication that the processor or memory circuitry is receiving electrical power from the AC power source, selectively cause operational electrical power to be provided to a first number of the functional units of the processor or memory circuitry. The processing circuitry is further to: based on an indication that the circuitry is receiving electrical power from the battery, selectively cause operational electrical power to be provided to a second number of the functional units of the processor or memory circuitry, the second number being less than the first number.

16 Claims, 5 Drawing Sheets

(51) Int. Cl.
    G06F 1/3215        (2019.01)
    G06F 1/3234        (2019.01)

(56)                References Cited

U.S. PATENT DOCUMENTS

| | | | |
|---|---|---|---|
| 2008/0197716 A1* | 8/2008 | Rubio | H02J 9/061 |
| | | | 307/128 |
| 2011/0050710 A1* | 3/2011 | Sadowski | G06F 9/544 |
| | | | 345/536 |
| 2014/0189377 A1 | 7/2014 | Subbareddy et al. | |
| 2016/0330692 A1 | 11/2016 | Zajac | |
| 2019/0361516 A1 | 11/2019 | Bhattacharyya et al. | |

OTHER PUBLICATIONS

International Preliminary Report on Patentability mailed Apr. 4, 2024 for International Application No. PCT/US2021/051470, 7 pages.
Extended European Search Report issued Apr. 24, 2025 for EP Application No. 21958556.9, 11 pages.

* cited by examiner

<u>400</u>

410 — Cause electrical power to be provided to a first number of the logic units 420 — Cause electrical power to be provided to a second number of the logic units 430 — Cause electrical power to be provided to a third number of the logic units

CONTROLLING A POWER CONSUMPTION OF CIRCUITRY

RELATED APPLICATIONS

The present application is a national phase entry under 37 U.S.C. § 371 of Int'l App. No. PCT/US2021/051470, filed Sep. 22, 2021, which designated, among various States, the United States of America, the content of which is hereby incorporated by reference in its entirety and for all purposes.

BACKGROUND

The size of discrete graphics processing units, GPUs, used in mobile platforms (e.g., laptops or tablet computers) is increasing rapidly over time as vendors try to pack increasing amounts of computing power into the GPU. Improved thermal designs enable cooling of GPUs that use ever increasing power budgets, which may exceed 150-200 W. However, when the user switches from AC mains power supply to battery power, the power and peak current which can be sustained by the mobile platform are significantly limited. The power capacities of batteries cannot be increased significantly in part because, in some jurisdictions, battery capacity is legally constrained for safety reasons. This poses considerable challenges to GPU performance. Similar issues will arise with increased sizes of central processing units, CPUs, and computer memories.

BRIEF INTRODUCTION OF THE DRAWINGS

Example implementations are described below with reference to the accompanying drawings, in which.

DETAILED DESCRIPTION

Figure 1:
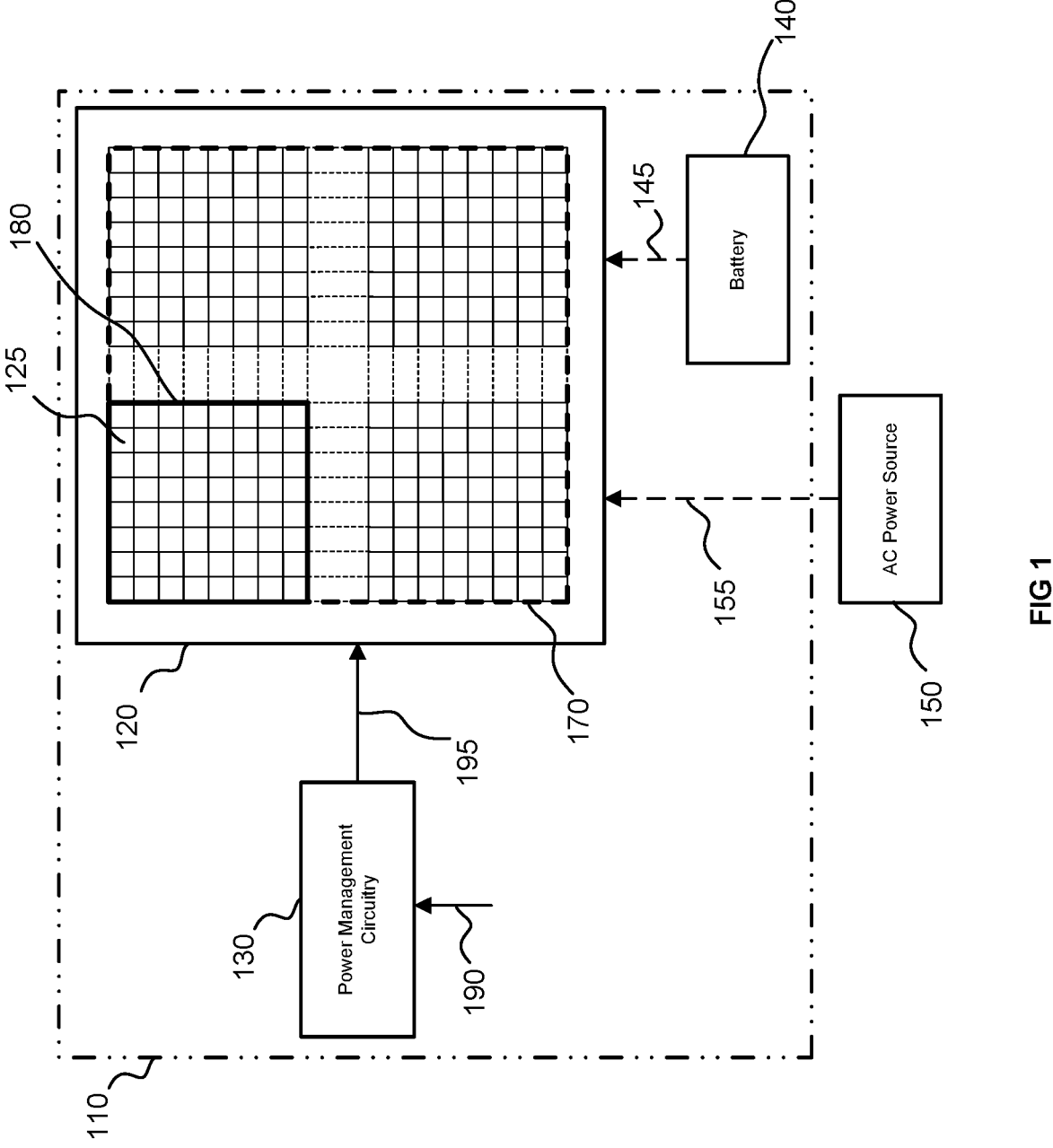
FIG. 1 is a schematic diagram of circuitry of a computing device.

FIG. 1 is a schematic diagram of circuitry of a computing device 110. The circuitry of the computing device 110 comprises circuitry 120, and power management circuitry 130 for managing power dissipation by the circuitry 120. The circuitry 120 may be processor or memory circuitry. The computing device 110 further comprises a battery 140. The computing device 110, and thus the processor or memory circuitry 120, can receive electrical power from the battery 140 or from an alternating current (AC) power source 150 such as an AC mains supply (power grid).

The computing device 110 may correspond to any type of computing device, such as, for example, any type of portable computing device, such as (but not limited to) a laptop computing device, a tablet computing device or a smart-phone.

The circuitry 120 may comprise memory circuitry 120. The memory circuitry may comprise any type of memory, such as, for example, any type of random access memory (RAM) such as any one of: RAM for a central processing unit (CPU) (i.e., so-called system memory or main memory); RAM for a graphics processing unit (GPU) (i.e., so-called video RAM (VRAM)); a cache memory (e.g., for a CPU or a GPU); embedded memory of a (e.g., discrete) graphics processing unit, GPU (e.g., RAM for the discrete GPU which may be located in the same package as the discrete GPU, but may be in a separate die from the discrete GPU); or any other type of computer memory.

The circuitry 120 may comprise processor circuitry 120. The processor circuitry may comprise any type of processor circuitry, such as, for example, any type of processor such as (but not limited to) any one of: a central processing unit (CPU); a (e.g., discrete) graphics processing unit (GPU); an image processing unit; a digital signal processing unit; a data processing unit.

The processor or memory circuitry 120 comprises a plurality of functional units 125. As used herein, the term functional unit may refer to any unit configured to execute a functional operation of the circuitry 120. For example, when the circuitry 120 refers to processor circuitry, such as a processor, a functional unit may refer to a processing core of a plurality of processing cores of the processor circuitry. A processing core of a graphics processing unit will be referred to herein as an execution unit (EU) of a graphics processing unit. As used herein, a processing core, such as an EU, for example, may comprise circuitry operable to execute computer program instructions. In another example, when the circuitry 120 refers to memory circuitry, a functional unit may refer to a memory unit of a plurality of memory units of the memory circuitry 120. A memory unit may (which may correspond to a memory bank) may comprise a plurality of memory cells, wherein a memory cell is operable to store data. The data may comprise, for example one bit of binary data. A memory unit may have a data storage capacity in the range of 10 MB to 1 GB, for example, or any other suitable data storage capacity. The functional units may be implemented using any suitable technology, including but not limited to complementary metal oxide semiconductor (CMOS) technology. The functional units 125 of the memory or processor circuitry 120 may be provided in (i.e., may reside in) a common chip. The functional units 125 of the processor or memory circuitry 120 may be provided on (i.e., may reside on) a common die. The functional units 125 of the processor or memory circuitry 120 may be provided in (i.e., may reside in) a common package. In some examples, the functional units 125 of the processor or memory circuitry 120 may be provided in (i.e., may reside in) a plurality of packages. The packages may be thermally coupled to each other. The packages may share (e.g., may have a combined power consumption which is restricted by) a common power budget (e.g., a common power budget allocated to the packages).

It is to be understood that the number of functional units 125 shown in FIG. 1 is merely illustrative and does not limit the present disclosure. The processor or memory circuitry 120 may comprise any number of functional units 125 greater than or equal to two. For example, in examples where the processor or memory circuitry 120 comprises a processor, the processor may comprise any number of processing cores greater than or equal to two, such as but not limited to: at least two processing cores, at least four processing cores, at least eight processing cores, at least sixteen processing cores, or at least thirty-two processing cores. In examples where the processor or memory circuitry 120 comprises a discrete GPU, the discrete GPU may comprise any number of EUs greater than or equal to two, such as but not limited to, at least 128 EUs, at least 256 EUs, at least 512 EUs or at least 1024 EUs. In examples where the processor or memory circuitry 120 comprise a processor having a plurality of processing cores, the plurality of processing cores may be arranged to execute instructions in parallel (i.e., the one or more processing cores may execute instructions substantially simultaneously). In these, examples, the instructions may belong to a plurality of instruction queues (e.g., each instruction queue of the plurality corresponding to a respective processing core) or may belong to a common instruction queue (e.g., comprising a single instruction queue common to each of the plurality of processing cores). In some examples, processing cores of the processor (e.g., processing cores to which operational electrical power is selectively provided) may be arranged to execute instructions in parallel from a common workload. For example, a workload may be parallelised across the said processing cores of the processor.

In examples where the processor or memory circuitry 120 comprises a memory, the memory may comprise any number of memory units greater than or equal to two, such as but not limited to: at least two memory units, at least four memory units, at least eight memory units, at least sixteen memory units, or at least thirty-two memory units.

The battery 140 may comprise any type of battery such as any type of rechargeable battery. The battery 140 may have any type of battery chemistry, such as but not limited to lithium-ion chemistry. The battery 140 is selectively couplable to the processor or memory circuitry 120, as indicated by the dashed arrow 145 in FIG. 1, and is operable to provide electrical power to the processor or memory circuitry 120. The battery 140 may provide electrical power to the processor or memory circuitry 120 when, for example, the computing device 110 is not operably coupled to the AC power source 150 e.g., when the computing device 110 is mobile and unplugged from a mains power outlet. The battery 140 has a capacity corresponding to the amount of energy it can store (e.g., when fully charged). In some examples, the battery 140 may have a (e.g., nominal) capacity of less than or equal to 100 Watt hours (Wh) such as, for example, 99 Wh or 80 Wh. While not shown in FIG. 1, the battery 140 may also be selectively couplable and operable to selectively provide electrical power to other (e.g., active i.e., powered) components of the computing device 110 including the power management circuitry 130 and other components not shown (e.g., display).

The AC power source 150 is selectively couplable to the processor or memory circuitry 120 (e.g., by a user of the computing device 110), as indicated by the arrow 155 in FIG. 1, and is operable to provide electrical power to the processor or memory circuitry 120. The AC power source 150 may comprise, for example, mains electricity (which may alternatively be known as e.g., utility power, the power grid, wall power etc.). The AC power source 150 may be selectively couplable to the computing device 110, via, for example, a (e.g., wired or wireless) charger or electrical (e.g., AC to DC) transformer electrically connected between the AC power source 150 and the computing device 110.

It is to be understood that the term AC power source refers to the type of power source from which the electrical power originates and not to the type of power received by the computing device 110 or the processor or memory circuitry 120. For example, in examples where the AC power source 150 is coupled to the processor or memory circuitry 120 via a charger or transformer, the charger or transformer may be arranged to receive and rectify AC electrical power from the AC power source and to output DC electrical power to the computing device 110 and in turn the processor or memory circuitry 120. While not shown in FIG. 1, the AC power source 140 may also be selectively couplable and operable to provide electrical power to other (e.g., active i.e., powered) components of the computing device 110 including the power management circuitry 130, the battery 140 (e.g., to the charge the battery 140) and other components not shown (e.g., display).

The processor or memory circuitry 120 is arranged to receive electrical power from either the AC power source 150 (e.g., and not battery 140) or the battery 140 (e.g., and not the AC power source 150). As an illustrative example, a user of the computing device 110 may couple the AC power source 150 to the computing device 110, such as when the computing device is substantially stationary, such as by connecting an AC to DC transformer between a mains outlet socket and the computing device 110. In this case, the processor or memory circuitry 120 (and e.g., one or more other active components of the computing device 110) may receive electrical power from the AC power source (e.g., and not from the battery). Continuing with this example, the user of the computing device 110 may wish to subsequently use the computing device 110 as a portable (i.e., mobile) computing device and may decouple the AC power source from the computing device 110 (e.g., by disconnecting the AC power source from the computing device 110). In this circumstance, the processor or memory circuitry 120 (and e.g., one or more other active components of the computing device 110) may receive electrical power from the battery 140 (e.g., and not from the AC power source 150).

The battery 140 and the AC power source 150 may be selectively couplable to the processor or memory circuitry 120 via any suitable electrical coupling means. The battery 140 and the AC power source 150 may be indirectly couplable to the processor or memory circuitry 120 e.g., through other circuitry such as, for example, one or more voltage regulators or any other suitable type of (e.g., regulating) circuitry.

The processor or memory circuitry 120 may be arranged to (e.g., selectively) receive at least one supply voltage ($V_{dd}$) and at least one clock signal (not shown). Both the at least one supply voltage and the at least one clock signal may be generated based on (i.e., using) power received from the one of the AC power source 150 and the battery 140 coupled to the processor or memory circuitry 120 at a given time. For example, when the processor or memory circuitry 120 is receiving electrical power from the AC power source 150, the at least one supply voltage and the at least one clock signal may be generated based on (i.e., using) electrical power received from the AC power source 150. Similarly, when the processor or memory circuitry 120 is receiving electrical power from the battery 140, the at least one supply voltage and the at least one clock signal may be generated based on (i.e., using) electrical power received from the battery 140. The at least one clock signal may be generated by, for example, one or more clock generating circuits, such, as, for example, one or more phase locked loops (not shown). The one or more clock signals may be distributed to the functional units 125 of the processor or memory circuitry 120 via e.g., a clock distribution network (which may also be referred to as a clock tree). Such a clock distribution network may be a part of infrastructural circuitry of the processor or memory circuitry 120. The infrastructural circuitry may be arranged to facilitate functionality of the processor or memory circuitry 120, for example by delivering clock pulses to functional units of the processor or memory circuitry 120. When in use, the infrastructural circuitry may give rise to an associated power consumption of the processor or memory circuitry 120, referred to herein as an infrastructural power consumption. As an illustrative example, in examples where the infrastructural circuitry comprises a clock distribution network, the clock distribution network may comprise one or more clock buffers, each of which may consume electrical power when operational. As will be discussed further below, electrical power may be selectively removed from one or more portions of the infrastructural circuitry, such as one or more portions (e.g., branches) of the clock distribution network (which may comprise one or more clock buffers), for example, by controlling one or more gates configured to control infrastructural power delivery to the respective portions of the infrastructural circuitry.

The AC power source 150 may be operable to provide a given electrical power to the computing device 110 for arbitrarily long periods of time (assuming e.g., that the AC power source remains operational and the computing device 110 remains connected to the AC power source). Accordingly, when powered by the AC power source 150, the processor or memory circuitry 120 (and other components of the computing device 110) may be able to operate at their respective maximum rated power consumption, and hence the processor or memory circuitry 120 (and the computing device 110) may be able to operate at their maximum rated performance level.

By way of contrast, the limited energy storage capacity of the battery 140 limits the amount of electrical power that it can provide for a given duration. For example, if the battery 140 has a capacity of 100 Wh, the battery 140 is operable to provide 100 W of electrical power for a duration of one hour, or 50 W of electrical power for two hours etc. Accordingly, the capacity of the battery 140 places a constraint on the amount of electrical power that can be consumed by the processor or memory circuitry 120 in order for the computing device 110 to remain operational for sufficiently long periods of time to provide for useful functionality to the user (e.g., on the order of an hour or hours). Accordingly, when the power source switches from receiving AC mains power to receiving battery power, a power budget (i.e., the quantity of power the circuitry 120 is permitted to consume) for the processor or memory circuitry 120 (and in some examples other components of the computing device 110) may be reduced. This may result in the processor or memory circuitry 120 operating below its maximum rated performance.

As an illustrative example, Table 1 provides an example of the differing available power budgets for a discrete graphics processing unit (GPU) of a computing device, such as the computing device 110, when the computing device is powered by an AC power source and when the computing device is powered by a battery having a capacity of 80 Wh, based on the assumption that the battery is to power the computing device for at least 1 hour.

TABLE 1

| | AC Power source | 80 WHr Battery |
|---|---|---|
| GPU power budget | 135 W | 18 W |
| Power budget for other components | 95 W | 62 W |
| Total power budget | 230 W | 80 W |

As shown, when connected to the AC power source, the total power budget of the computing device is 230 W, wherein the power budget for the GPU is 135 W and the remaining 95 W is dissipated by other components of the computing device, such as, e.g., a display, and system memory etc. Of the 95 W power budget for the GPU, 40 W may be budgeted for static power consumption of the GPU (i.e., power consumption associated with leakage currents of the GPU), infrastructural power consumption of the GPU (i.e., power consumption associated with infrastructural circuitry arranged to facilitate operation of the GPU), and other power losses associated with the GPU, such as, for example, power losses associated with VRAM of the GPU. Accordingly, 95 W may be budgeted for doing work (e.g., processing instructions) by the EUs of GPU, i.e., 95 W may be budgeted to be consumed as dynamic power by the EUs of the GPU. When powered by the battery, the total power budget of the computing device is reduced to 80 W in this example, which provides for a power budget for the GPU of just 18 W and a power budget for other components of the computing device such as those described above of 62 W. Of the 18 W power budget for the GPU, 17 W are budgeted for static power consumption of the GPU, infrastructural power consumption of the GPU, and other power losses associated with the GPU, leaving just 1 W for dynamic power consumption by the EUs of the GPU. Thus, in this example, the power budget for the dynamic power consumption of the EUs of the GPU reduces significantly when the computing device 110 is powered by the battery compared to the AC power source. Thus, when the computing device is switched from AC mains power to battery power, the power consumption of the GPU may need to be reduced to account for the reduced power available for dynamic power consumption of the EUs of the GPU.

One solution for reducing the power consumption of a discrete GPU when the computing device is switched from AC mains power to battery power is to reduce the clock frequency of the GPU.

For CMOS technology, dynamic power consumption (i.e., the power consumption associated with clocking of the CMOS circuitry), $P_d$ is given by:

$$P_D = fC_{eff}V_{dd}^2, \qquad \text{[Eq. 1]}$$

where: $C_{eff}$ is the effective gate capacitance being charged per clock cycle, which is proportional to the total number of transistors and, in turn, the number of powered EUs of the GPU; $V_{dd}$ is the supply voltage; and f is the frequency at which the EUs are clocked. Reducing the clock frequency therefore reduces the dynamic power consumption in accordance with Eq. 1. However, only reducing the clock frequency of the GPU to accommodate a significantly reduced power budget for the GPU may significantly reduce the performance of the GPU.

As indicated above, in addition to dynamic power dissipation caused by operation of the functional units to perform useful work, the power consumption of CMOS circuitry also includes a static component (due to e.g., leakage currents) and may further include an infrastructural component resulting from power loss due to infrastructural circuitry required to facilitate functionality of the processor or memory circuitry 120, such as, for example, clock distribution circuitry (not shown).

The greater the number of EUs in a GPU, the higher the static power and infrastructural power consumption, and the smaller the power budget available for dynamic power consumption of the EUs of the GPU. Thus, when the computing device 110 is switched from receiving AC power to receiving battery power, the power budget for operating the GPU is reduced and because the static power consumption remains constant, the dynamic power dissipated by the EUs of the GPU is reduced in order to remain within the reduced power budget.

As the number of functional units in processing and memory circuitry (e.g., EUs in a GPU) continue to increase in newer designs, it becomes increasingly challenging to fit enough performance in the same platform power budget (which may be dictated by a capacity of the battery powering the platform) due to the increased infrastructural and static power consumption.

An additional or alternative way to manage power consumption of processor or memory circuitry 120 will now be described. When the computing device 110 is switched between AC mains power to battery power, the size of the processor or memory circuitry 120 may be scaled (e.g., to scale the number of operational functional units of the processor or memory circuitry) depending on whether the processor or memory circuitry is receiving power from an AC power source or from a battery. As used herein, an operational functional unit is a functional unit that is receiving operational electrical power. With respect to a functional unit, operational electrical power comprises an electrical power provided to the functional unit of processor or memory circuitry which enables the functional unit to perform its corresponding functional operation. Operational electrical power for a functional unit of the circuitry 120 includes a first power component which is consumed by the functional unit when performing its corresponding functional operation and is variable depending on a quantity of work being performed per unit time by the functional unit. For example, when the circuitry 120 comprises a processor and the functional unit comprises a processing core, the first power component may be variable depending on a workload (i.e., number of instructions being performed per unit time) of the processing core. In this case, the first power component may correspond to the dynamic power consumption of the processing core resulting from executing the workload by the processing core. In examples where the functional unit comprises a memory unit of memory circuitry, the first power component may vary depending on a number of input/out operations (i.e., read/write operations) being performed by the memory. For example, the first power component may correspond to the dynamic power consumption of the memory unit resulting from executing the input/output operations by the memory unit. However, when operational electrical power is provided to the functional unit, a second power component comprising static power consumption due to leakage currents present in the functional unit (the leakage currents resulting from a supply voltage being provided to the functional unit) is also delivered to and dissipated by the functional unit. A third power component comprising infrastructural power consumption of infrastructural circuitry operably coupled or couplable to the functional unit, such as, for example, clock distribution circuitry for delivering clock pulses to the functional unit, may also be dissipated by the infrastructural circuitry.

For a given supply voltage and clock frequency, the infrastructural power consumption the circuitry 120 which is associated with a functional unit may be substantially constant and may not depend on the quantity of work to be performed by the functional unit. In contrast, for a given supply voltage and clock frequency, the above-described first power component of operational electrical power of a functional unit does vary depending on the quantity of work being performed by the functional unit.

As will be discussed further below, the provision of operational electrical power to a functional unit may be disabled by, for example: disabling the provision of a supply voltage to the functional unit; disabling one or more portions of infrastructural circuitry (e.g., one or more branches of a clock distribution network) associated with (e.g., operably coupled to) the functional unit, such as to disable provision of a clock signal to the functional unit; or both disabling the provision of a supply voltage to the functional unit and disabling one or more portions of infrastructural circuitry associated with (e.g., operably coupled to) the functional unit.

Thus, disabling the provision of operational electrical power to one or more functional units not only saves power that would have been otherwise consumed by the one or more of functional units as dynamic power consumption of the one or more functional units, but may also save power that would have been otherwise consumed by the one or more functional units due to one or both of static power dissipation and power that would have been otherwise consumed by infrastructural circuitry of the processor or memory circuitry associated with the one or more functional units.

Hence, scaling the size of the processor or memory circuitry 120 allows the power consumption of processor or memory circuitry 120 to be reduced. Advantageously, and counterintuitively, by scaling down the number of operational functional units, the circuitry 120 may also be provided with an improved performance than would be obtainable by the circuitry 120 with the original number of operational function units for a given power budget. Applying the present scaling technique to achieve improved performance in a processor, such as a discrete GPU, which comprises a plurality of cores (e.g., execution units) for processing a single workload (e.g. from a common instruction queue) parallelised across the cores is particularly counterintuitive because, in normal use, the cores of the processor are utilised together to perform the same workload and are thus less likely to be idle.

A number of operational functional units of the processor or memory circuitry may be reduced when the processor or memory circuitry is receiving electrical power from a battery, such as e.g., the battery 140, relative to when the processor or memory circuitry is receiving electrical power from a mains AC power source, such as e.g., the AC power source 150. Counterintuitively, reducing the number of functional units receiving operational electrical power not only reduces the power consumption of the processor or memory circuitry, but also enables an improved performance of the processor or memory circuitry relative to a performance obtainable when providing operational electrical power to a greater number of functional units of the processor or memory circuitry for a given power budget. This is explained as follows.

Reducing the number of the functional units arranged to receive operational electrical power by disabling the provision of a supply voltage to one or more functional units reduces the static power consumption associated with the processor or memory circuitry 120 by virtue of there being fewer functional units through which leakage currents can flow. Reducing the number of the functional units arranged to receive operational electrical power by disabling one or more portions of infrastructural circuitry, such as one or more clock branches of a clock tree, associated with one or more functional units (e.g., to disable a clock signal provided to the one or more functional units) reduces infrastructural power consumption of the circuitry 120. Thus, one or both of the static and infrastructural power consumption of the processor or memory circuitry 120 may be reduced.

The power saved by reducing the number of functional units of the processor or memory circuitry arranged to receive operational electrical power facilitates an increased dynamic power budget for the remaining operational functional units of the processor or memory circuitry, which can be used to provide an improved performance of the processor or memory circuitry for a given power budget relative to the performance obtainable when providing operational electrical power to the original, larger number of functional units.

Figure 2:
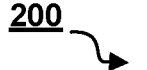
FIG. 2 depicts example power-performance curves for small and large variants of a discrete graphics processing unit.
Figure 2:
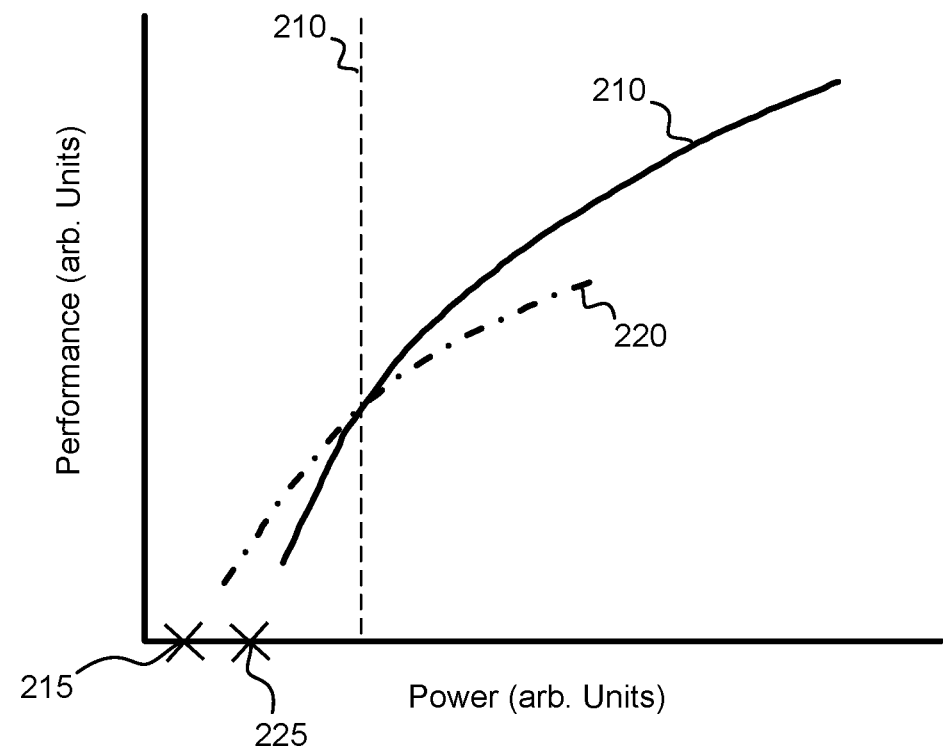

As an illustrative example, FIG. 2 shows example power-performance curves for small and large variants of a discrete GPU, the small variant comprising the same total number of execution units as the large variant but fewer operational execution units (e.g., fewer execution units arranged to receive operational electrical power). In this example, the large variant comprises a first number of operational execution units (e.g., execution units arranged to receive operational electrical power) and the small variant comprises a second number of operational execution units (e.g., execution units arranged to receive operational electrical power), the second number being one quarter of the first number. In this example, the functional units of the small variant not receiving operational electrical power have had both their supply voltage and their associated infrastructure circuitry (such as clock distribution circuitry) disabled.

The solid line 210 corresponds to an example power-performance curve for the large variant and the dot-dash line 220 corresponds to an example power-performance curve for the small variant.

Due to the reduced number of operational execution units of the small variant, and due to both the supply voltage and the infrastructural circuitry associated with the functional units not receiving operational electrical power having been disabled, both the static power consumption and the infrastructural power consumption associated with the small variant are less than that associated with the large variant as explained above. This can be observed from FIG. 2 by examining the point at which the respective power-performance curves would cross the x-axis if extrapolated thereto, as indicated by the cross 215 (for the small variant) and the cross 225 (for the large variant): at the point of crossing the x-axis, the corresponding performance is zero and the power consumption corresponds to static and infrastructural power consumption components only. It can be seen from FIG. 2 that the large variant (225) has a higher static and infrastructural power consumption than the small variant (215).

The performance of processor circuitry such as a GPU (or indeed any other processor circuitry, or memory circuitry, for example) may be approximately proportional to the number of operational functional processing units of the processor circuitry and the frequency at which they are clocked. For example, performance may correspond to, for example, a number of instructions executed per second (e.g., million instructions per second (MIPS)), or a number of floating point operations per second (FLOPS), both of which are proportional to the number of operational functional processing units of the processor circuitry and the frequency at which they are clocked. In examples wherein the processor or memory circuitry 120 comprises a memory, the performance may comprise, for example, a number of input/output operations per second (IOPS), which is proportional to the number of memory units and the frequency at which they are clocked.

As shown in FIG. 2, for the both of the small and the large variants of the discrete GPU, their performance increases with increasing power dissipation and the rate at which the performance increases with respect to power dissipation decreases with increasing power dissipation.

Two regions demarcated by the line 210 are shown in FIG. 2. In the region to the right of the line 210, it can be seen that, for a given power consumption, the performance of the large variant (illustrated by line 210) exceeds that of the small variant. This can be understood as follows.

As discussed above, the performance of processor circuitry such as a GPU is approximately proportional to the number of the operational functional processing units and the frequency at which they are clocked, that is:

$$P_{erf} \sim N_{FU}f, \qquad \text{[Eq. 2]}$$

where $P_{erf}$ is the performance of the processor circuitry 120, $N_{FU}$ is the number of operational functional processing units of the processor circuitry and f is the frequency at which the $N_{FU}$ functional processing units are clocked.

In accordance with Eq. 1 above, the dynamic power consumption of the small variant can be written as:

$$P_{D\_small} = f_{small}C_{eff\_small}V_{dd\_small}^2, \qquad \text{[Eq. 3]}$$

and the dynamic power consumption of the large variant can be written as:

$$P_{D\_large} = f_{large}C_{eff\_large}V_{dd\_large}^2 - f_{large}4C_{eff\_small}V_{dd\_large}^2 \qquad \text{[Eq. 4]}$$

It can be understood that $C_{eff\_large}=4C_{eff\_small}$ on the basis that the large variant has four times the number of operational functional processing units than the small variant.

From equations 3 and 4, it can be seen that for the dynamic power consumption of the large variant to be equal that of the small variant, $$f_{large}V_{dd\_large}^2 = \frac{f_{small}V_{dd\_small}^2}{4}.$$

Thus, for the dynamic power consumption of the large variant to be equal that of the small variant, assuming the supply voltage for both the small and large variants were to be equal (i.e., $V_{dd\_large}=V_{dd\_small}$), $f_{large}$ would be four times smaller than $f_{small}$. In this case, the performance of both large and small variants would also be approximately equal because the performance increase of the large variant (due to having four times as many operational functional processing units as the small variant) is counterbalanced by having a clock frequency that is four times slower than that for the small variant. That is:

$$P_{erf\_large} \sim 4N_{FU_{small}}f_{Large} = \qquad \text{[Eq. 5]}$$

$$4N_{FUsmall}\frac{f_{small}}{4} = N_{FUsmall}f_{small} \sim P_{erf\_small}$$

However, the supply voltage for the small and large variants need not be fixed. Rather, supply voltage can be reduced with reducing clock frequency. Thus, the supply voltage for the large variant can be lower than that for the small variant. Accordingly, it is possible that $$f_{Large} > \frac{f_{small}}{4}$$

while maintaining the equality that $$f_{large} V_{dd\_large}^2 = \frac{f_{small} V_{dd\_small}^2}{4}.$$

As a result, in the region to the right of the line 210 in FIG. 2, for a given dynamic power dissipation, the large variant outperforms the small variant because the performance increase of the large variant due to having four times as many operational functional processing units as the small variant is greater than the performance reduction due to having a reduced clock frequency. In general, for a large variant having n times as many functional units as an otherwise corresponding small variant, in the region to the right of the line 210, for a given dynamic power dissipation, the large variant will outperform the small variant because, as a result of reducing the supply voltage of the large variant, the clock frequency of the large variant need not be reduced by as much as n times.

However, as discussed above, the large variant has an increased static consumption and an increased infrastructural power consumption compared to the small variant. Hence, for a given power budget, the power available for consumption as dynamic power by the large variant will be smaller than that available for consumption as dynamic power by the small variant. The region to the right of line 210 corresponds to the region where, for a total power consumption of the processor circuitry (e.g., including dynamic, static and infrastructural components), the increased efficiency of the large variant relative to the small variant outweighs the reduced power available to be dissipated as dynamic power consumption by the large variant.

In the region to the left of the line 120, it can be seen that, for a given power consumption, the performance of the large variant is less than the performance of the small variant. In this regime, the power saved from the reduced static and infrastructural power consumption of the small variant relative to the large variant provides for enough additional power to be consumed by the small variant as dynamic power so as to enable an improved performance of the small variant relative to the large variant, even when taking into account the efficiency improvements of the EUs of the large variant in operating at a lower supply voltage. Hence, in this region, the power saved by providing a supply voltage to and clocking fewer functional processing units of the small variant relative to the large variant enables, for a given power budget, the product of the number of the operational functional processing units of the small variant and the frequency at which they are clocked (i.e., $N_{FU\_small} f_{small}$) to exceed the product of the number of operational functional processing units of the large variant and the frequency at which they are clocked (i.e., $N_{FU\_large} f_{large}$), thus providing improved performance.

Referring back to FIG. 1, in order to compensate for a reduced power budget when the computing device 110 is switched from receiving electrical power from the AC mains supply 150 to receiving electrical power from the battery 140, the power management circuitry 130 may be operable to selectively control the quantity of the functional units 125 of the processor or memory circuitry 120 arranged to receive operational electrical power depending on an indication of which power source—the battery 140 or the AC power source 150—is providing electrical power to the processor or memory circuitry 120. For example, based on (e.g., in response to) an indication that the processor or memory circuitry 120 is receiving electrical power from the AC power source 150, the power management circuitry 130 may selectively cause operational electrical power to be provided to a first number of the processing or memory functional units 125 of the processor or memory circuitry 120, as indicated by the box 170 of FIG. 1, and based on (e.g., in response to) an indication that the processor or memory circuitry 120 is receiving electrical power from the battery 140, the power management circuitry 130 may selectively cause operational electrical power to be provided to a second number of the processing or memory functional units 125 of the processor or memory circuitry 120, as indicated by the box 180 of FIG. 1, the second number being less than the first number. Thus, based on (e.g., in response to) detecting a change from the processor or memory circuitry 120 receiving operational electrical power from one of the AC power supply and the battery to the processor or memory circuitry 120 receiving operational electrical power form the other of the AC power supply and the battery, the power management circuitry 130 may be to cause the processor or memory circuitry 120 to be reconfigured from operating with the first number of operational functional units to operating with the second number of operational functional units or vice versa.

For example, the processor or memory circuitry 120 may comprise a (e.g., discrete) processor, such as any processor disclosed herein or any other type of processor, and the plurality of functional units may comprise a plurality of processing cores (which may also be referred to as execution units in examples where the processor comprises a GPU). In this case, the power management circuitry 130 may, based on the indication that the circuitry 120 is receiving electrical power from the AC power source 150, selectively cause (as indicated by the arrow 195) operational electrical power to be provided to the first number of the execution units and, based on an indication that the circuitry 120 is receiving electrical power from the battery 140, selectively cause (as indicated by the arrow 195) operational electrical power to be provided to the second number of the execution units.

In another example, the processor or memory circuitry 120 may comprise a memory, such as any type of memory disclosed herein on any other type of memory, and the plurality of functional units comprises a plurality of memory units. In this case, the power management circuitry 130 may, based on the indication that the circuitry is receiving electrical power from the AC power source 150, selectively cause operational electrical power to be provided to the first number of the memory units; and, based on an indication that the circuitry is receiving electrical power from the battery 140, selectively cause operational electrical power to be provided to the second number of the memory units.

The power management circuitry 130 may be implemented in any one of hardware, software, firmware, or any combination thereof. In some examples, the power management circuitry 130 may comprise processing circuitry executing computer program instructions, for example of software or firmware or both, which may be stored in a memory coupled to the power management circuitry 130. The power management circuitry 130 may be located on a same chip as the processor or memory circuitry 120 or on a different chip to that of the processor or memory circuitry 120. In some examples, the power management circuitry 130 may reside on a die or a package common to both the power management circuitry 130 and the processor or memory circuitry 120.

While the first number is shown to encompass all of the functional units comprised within the processor or memory circuitry 120, this is merely one illustrative example, and the present disclosure is not so limited. The first number of the functional units 125 may comprise any number of functional units 125 greater than the second number, such as: all of the functional units 125 of the processor or memory circuitry 120; or a subset of the functional units 125 of the processor or memory circuitry 120.

While the second number is shown to encompass a subset of the functional units 125 of the first number of the functional units 125, this is merely one illustrative example, and the present disclosure is not so limited. The functional units 125 of the second number of the functional units may comprise or consist of a subset of the functional units 125 of the first number of the functional units 125. Additionally or alternatively, the functional units 125 of the second number of the functional units 125 may comprise functional units 125 not included in the first number of the functional units 125.

In order to determine whether the processor or memory circuitry 120 is receiving electrical power from the AC power source 150 or from the battery 140, the power management circuitry 130 is arranged to receive a signal comprising an indication of a type of the power source—the battery 140 or the AC power source 150—from which the processor or memory circuitry 120 is receiving electrical power, as indicated by the arrow 190 in FIG. 1. The indication 190 may be received from a power management controller of the computing device 110, or from any other suitable circuitry of the computing device 110. In some examples, the power management 130 circuitry may be arranged to receive (e.g., from the power management controller) a binary digit indicative of the type of power source from which the processor or memory circuitry 120 is receiving electrical power, wherein one value of the binary digit conveys that the processor or memory circuitry 120 is receiving electrical power from one of the AC power source 150 and the battery 140, and the other value of the binary digit conveys that the processor or memory circuitry 120 is receiving electrical power from the other of the AC power source 150 and the battery 140. In other examples, the power management circuitry 130 may be arranged to receive any other type of signal comprising an indication of the type of power source (e.g., the AC power source 150 or the battery 140) from which the processor or memory circuitry 120 is receiving electrical power.

The power management circuitry 130 may be arranged to selectively cause operational electrical power to be provided to the first number of the functional units 125 and to selectively cause operational electrical power to be provided to the second number of the functional units 125 by selectively controlling one or more gates (e.g., transistors) configured to control operational power delivery to the respective functional units 125 of the processor or memory circuitry 120. The power management circuitry 130 may be to selectively cause operational electrical power to be provided to the second number of the processing or memory functional units 125 of the processor or memory circuitry 120 (e.g., operational power initially being provided to the first number of functional units when the processor or memory circuitry 120 is powered by way of the AC power supply) by selectively disabling at least a subset of functional units of the first number of functional units, for example by disabling provision of operational electrical power thereto. For example, the power management circuitry 130 may be arranged to selectively reduce a number of functional units to which operational power is provided from the first number to the second number by selectively disabling the provision of a supply voltage to at least a subset of the first number of the functional units. In these examples, disablement of the provision of the supply voltage may comprise switching one or more gates (e.g., transistors) configured to control delivery of the supply voltage to the at least the subset of the first number of functional units. In some examples, the power management circuitry 130 may be arranged to selectively reduce a number of functional units to which operational power is provided from the first number to the second number by selectively disabling one or more portions of infrastructural circuitry (such as one or more clock branches of a clock tree) associated with, such as to selectively disable provision of a clock signal to, at least a subset of the first number of the functional units. In these examples, disablement of the one or more portions of the infrastructural circuitry associated with the at least the subset of the first number of the functional units may comprise switching one or more gates (e.g., transistors) configured to control power delivery to the one or more portions of the infrastructural circuitry.

The first number of the functional units 125 may be a predetermined (e.g., fixed) number. The first number may include all of the functional units 125 of the circuitry 120 (for example).

The second number of the functional units 125 may be a predetermined (e.g., fixed) number. For example, the second number of the functional units 125 may comprise a predetermined number, the predetermined number comprising any number smaller than the first number of the functional units 125. The predetermined (e.g., fixed) number may be determined based on characterisation data, the characterisation data characterising performance of the processor or memory circuitry 120 as a function of power consumption by the processor or memory circuitry 120 for different numbers of operational functional units 125 of the processor or memory circuitry 120. In some examples, the value of the second number may depend on one or both of the capacity or present charge state of the battery. For example, the second number may be variable, for example depending on an indication of battery capacity or present battery charge state as discussed below.

The power management circuitry 130 may be arranged to determine a value of the second number of the functional units 125 of the processor or memory circuitry 120 based on an indication of an energy storable or stored by the battery 140 (i.e. an indication of the battery 140 capacity or present charge state of the battery 140). For example, the second number may be greater for a battery with greater capacity or a battery with a greater charge stored on it, and the second number may be less for a battery with a lower capacity or a battery with a lower charge stored on it. The said indication may comprise one or both of: an indication of a (e.g., nominal) capacity the battery 140 (e.g., a nominal capacity of the battery when fully charged); and an indication of a present charge state of the battery 140. The power management circuitry 130 may be arranged to receive a signal comprising the said indication, for example from a power management controller of the computing device 110. The signal may be the same or different from the signal comprising the indication of the power source from which the processor or memory circuitry 120 is receiving electrical power.

In some examples, e.g., having caused the provision of operational electrical power to the second number of the functional units 125 (e.g., in response to the computing device 110 having switched from AC power to battery power), the power management circuitry 130 may, based on an indication that a charge state of the battery 140 is less than or equal to a predetermined threshold, reduce a number of the functional blocks 125 arranged to receive electrical power from the battery 140. For example, based on the indication that the processor or memory circuitry is receiving electrical power from the battery 140 and based on an indication that a charge state of the battery 140 is less than or equal to a predetermined threshold, the power management circuitry 130 may be arranged to reduce a number of the functional units 125 of the processor or memory circuitry 120 arranged to receive operational electrical power from the second number to a third number, the third number being less than the second number. Thus, based on (e.g., in response to) detecting that a charge state of the battery 140 is less than or equal to a predetermined threshold, the power management circuitry 130 may be to cause the processor or memory circuitry 120 to be reconfigured from operating with the second number of operational functional units to operating with the third number of operational functional units. As an illustrative example, the predetermined threshold may correspond to e.g., 20% of the fully charged capacity of the battery 140, and the power management circuitry 130 may be arranged to reduce the number of the functional units 125 of the processor or memory circuitry 120 arranged to receive operational electrical power from the battery depending on an indication that the charge state of the battery 140 is less than or equal to 20% of its fully charged state. This helps the processor or memory circuitry 120 to operate within a (further) reduced power budget, thereby helping to prolong the battery life when the charge state of the battery 140 is low. This is merely one illustrative example, however, and the present disclosure is not so limited.

The power management circuitry 130 may be arranged to receive a signal (not shown) comprising the indication that the charge state of the battery 140 is less than or equal to the predetermined threshold, for example from the power management controller of the computing device 110. In some examples, the indication may comprise an indication of any one or more of: an absolute charge state of the battery, e.g., in terms an energy stored; a relative charge state of the battery in terms of a percentage charged; and indication such as a flag indicating that the charge state of the battery is less than or equal to the predetermined threshold.

A power budget for processor or memory circuitry, such as the processor or memory circuitry 120, may depend on whether the processor or memory circuitry is receiving electrical power from an AC power source, such as the AC power source 150, or from a battery, such as the battery 140. The power budget may further depend on a capacity of a battery from which the processor or memory circuitry is receiving electrical power. The power budget may further depend on a charge state of a battery from which the processor or memory circuitry is receiving electrical power. The power budget may be set by circuitry of a computing device comprising the processor or memory circuitry, such as the power management circuitry 130 of the computing device 110, or any other suitable circuitry (e.g., a power management controller of the computing device). The set power budget may be stored in a (e.g., non-volatile) memory, such as, for example, a flash memory of e.g., the computing device 110 (not shown). The processor or memory circuitry may be controlled such that the power consumption of the processor or memory circuitry is in accordance with (e.g., within) the set power budget. A control algorithm for controlling the processor circuitry in this manner may include, for example, dynamic voltage and frequency scaling algorithms or any other suitable algorithm. The present scaling technique may be employed in combination with such control power consumption control techniques.

Based on the indication that the processor or memory circuitry 120 is receiving electrical power from the battery 140, the power management circuitry 130 may be arranged to set the supply voltage provided to the second number of the functional units 125 and the clock frequency of the second number of the functional units 125, to provide an improved performance of the processor or memory circuitry 120 relative to a performance obtainable by the first number of the functional blocks 125 (e.g., the first number of functional units receiving operational electrical power from the battery) based on a power budget for the processor or memory circuitry 120 when receiving electrical power from the battery 140.

For example, the power management circuitry 130 may set the supply voltage and the clock frequency of the second number of functional units so that a product of the second number and the clock frequency provided to the second number of functional units is greater than a product of the first number and a maximum clock frequency for the first number of the functional units, the maximum clock frequency being the maximum frequency at which the functional units can be clocked based on the power budget available for the processor or memory circuitry 120 when the processor or memory circuitry is receiving electrical power from the battery 140 (and based on the first number of functional units receiving operational electrical power from the battery 140). Thus, controlling the number of functional units of the processor or memory circuitry 120 which are to receive power may enable the processor or memory circuitry 120 to, when powered by the battery 140, operate at a point corresponding to a point lying in the region to the left of the line 210 of the power-performance plot shown in FIG. 2. In other words, reducing the number of operational functional units 125 of the processor or memory circuitry 120 in response to e.g., the computing device 110 having switched from AC power to battery power, may enable an increased performance of the processor or memory circuitry 120 in comparison to a performance achievable when providing operational electrical power to the original higher number of functional units 125. As explained in relation to FIG. 2 and the example small and large variants of the processor or memory circuitry associated therewith, this increased performance may result from having one or both of reduced static and infrastructural power losses due to providing operational electrical power to fewer functional units, and the power saved from the reduced static and infrastructural power losses may provide for enough additional power to be consumed by the second number of functional units as dynamic power so as to enable the improved performance.

In some examples, e.g., having caused the provision of operational electrical power to the second number of the functional units 125 (e.g., in response to the computing device 110 having switched from AC power to battery power), the power management circuitry 130 may, based on an indication that the processor or memory circuitry 120 is receiving electrical power from the AC power source (e.g., in response to the computing device 110 having switched from battery power back to AC power), be arranged to selectively cause operational electrical power to be provided to the first number of the functional units or a different number greater than the second number (e.g., to increase the number of functional units arranged to receive operational electrical power from the second number back to the first number). Doing so may, for example, enable the processor or memory circuitry 120 to, having switched from battery power to AC power, operate at a point corresponding to a point lying in the region to the right of the line 210 of the power-performance plot shown in FIG. 2 and thereby improve the performance of the processor or memory circuitry 120 in comparison to providing operational electrical power to the reduced second number of the functional units.

Similarly, e.g., having caused the provision of operational electrical power to the third number of the functional units 125 (e.g., in response to the charge state of the battery 140 falling below a predetermined threshold), the power management circuitry 130 may, based on an indication that charge state of the battery has increased above the predetermined threshold, be arranged to selectively cause operational electrical power to be provided to an increased number of the functional units (e.g., to increase the number of functional units arranged to receive operational electrical power from the third number back to the second number), for example to make use of an increased power budget to improve performance.

In examples where the processor or memory circuitry comprises a processor, prior to reducing a number of the processing cores arranged to receive operational electrical power from the first number to the second number, one or more pipelines (e.g., one or more instruction queues) associated with the processing cores of the processor which are to be disabled (i.e., have their respective provision of operational power disabled) may be pre-empted i.e., the pipeline may be prevented from receiving further instructions and the existing instruction(s) of the pipelines may be executed by the processing cores of the processor which are to be disabled, prior to their disablement.

In some examples, when scaling of the size of the processor or memory circuitry 120 (i.e., changing the number of functional units arranged to receive operational electrical power e.g., from the first number of the functional units to the second number of the functional units), data indicative of a current size (i.e., a current number of operational functional units) of the processor or memory circuitry 120 (e.g., for use in operation of the processor or memory circuitry 120) may be updated to reflect the change in the number of operational functional units due to the scaling. The data indicative of the current size of the processor or memory circuitry 120 may be stored in a memory, such as, for example, RAM, or any other type of memory. The data indicated of the current size of the processor or memory circuitry 120 may be updated by, for example, a driver of the computing device.

The circuitry of the computing device 110 illustrated in FIG. 1 has been simplified for the sake of clarity, and the computing device 110 may comprise conventional components of computing device not shown in FIG. 1, such as but not limited to, for example any one or more of: voltage regulation circuitry, clock distribution circuitry, input/output circuitry, communications circuitry, and one or more peripherals such as, for example, a display.

In examples where the processor or memory circuitry 120 comprises processor, the processor may be any type of processor such as, for example: a general-purpose processor or any other type of processor. The processor may have any type of architecture and may use any type of instruction set architecture, such as, for example: a complex instruction set computer (CISC) architecture, such as, for example, any version of the x86 architecture or any other CISC architecture; and a reduced instruction set computer (RISC) architecture, such as, for example, any version the Advanced RISC Machines (ARM) architecture, or any other RISC architecture.

Figure 3:
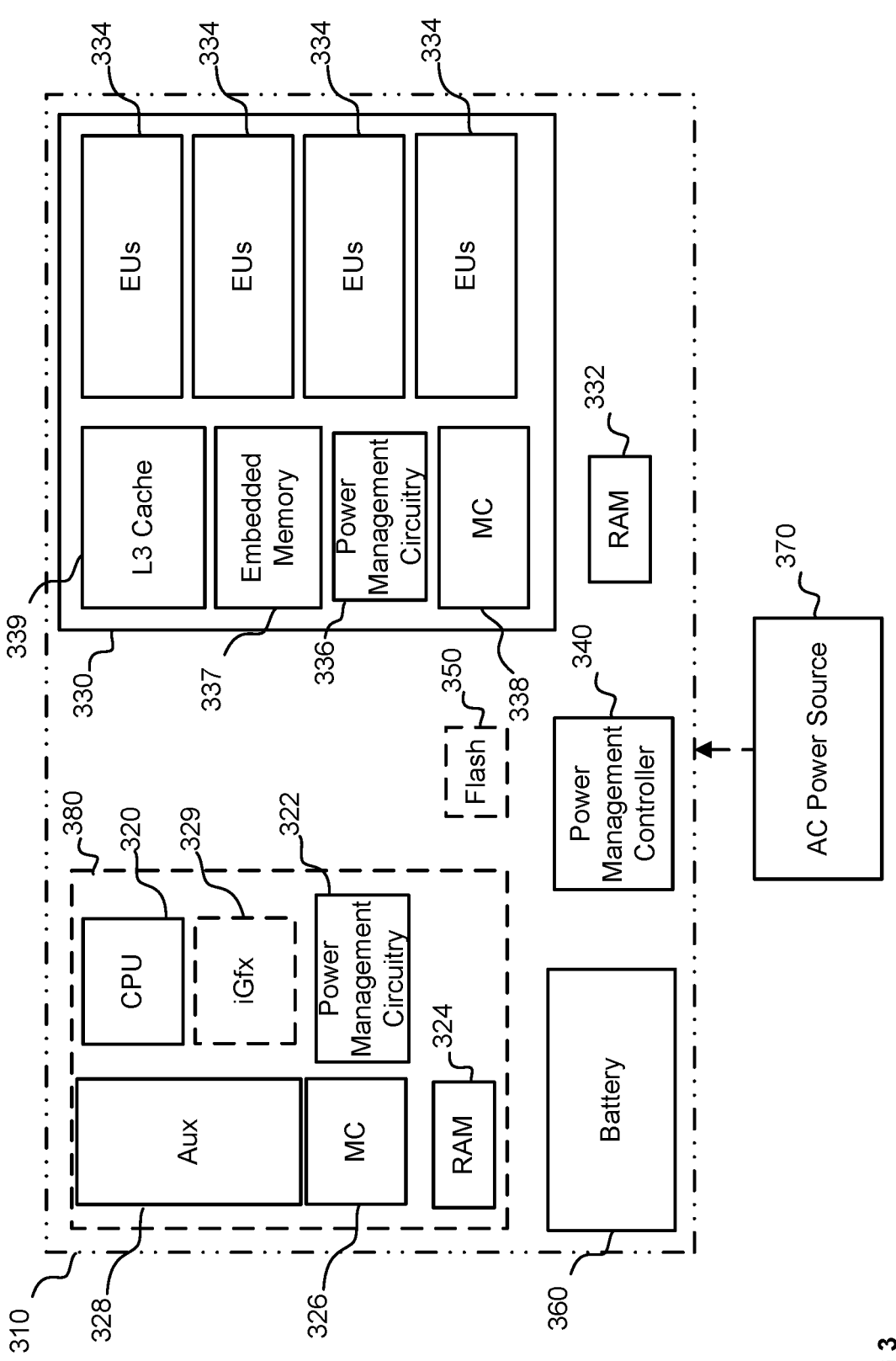
FIG. 3 is a schematic diagram of circuitry of a computing device.

FIG. 3 is a schematic diagram of circuitry of a computing device 310. The circuitry of the computing device 310 comprises: a central processing unit (CPU) 320 having one or more processing cores; power management circuitry 322 for managing a power consumption of the CPU 320; a dynamic random access memory (DRAM) 324 (which may be referred to as system memory) for the CPU 320, the DRAM 324 having a plurality of memory units (e.g., banks); a memory controller 326 arranged to transmit data between the DRAM 324 and the CPU 320; auxiliary circuitry 328; a (e.g., discrete) graphics processing unit (GPU) 330 having a plurality of execution units 334; power management circuitry 336 for managing a power consumption of the GPU 330; a DRAM 332 for the GPU 330 (e.g., VRAM), the DRAM 332 having a plurality of memory units (e.g., banks); a cache memory 339 of the GPU 330; an embedded memory 337 of the GPU 330; and a power management controller 340. In some examples, the circuitry of the computing device 310 may further comprise one or both of a GPU 329 integrated with the CPU, the integrated GPU 329 having a plurality of execution units, and a flash memory 350. The computing device 310 further comprises a battery 360.

The CPU 320 may comprise any type of CPU having any number of processing cores (such as two or more processing cores), and may be, for example, any type of CPU disclosed herein. In some examples, the CPU 320 may be a CPU of an CPU system on chip (SoC), as indicated by the box 380 of FIG. 3. In these examples, the CPU SoC may comprise any one or more of the following (e.g., on a common chip): the CPU 320; the power management circuitry 322; the DRAM 324; the memory controller 326; the auxiliary circuitry 328; the (e.g., integrated) GPU 329. While the box 380 is shown to encompass each of the CPU 320, the power management circuitry 322, the DRAM 324, the memory controller 326, the auxiliary circuitry 328, and the GPU 329, this is merely for illustrative purposes and the present disclosure is not so limited. As described above, in examples where the computing device 310 comprises a CPU SoC, the CPU SoC may comprise any one or more of the above-mentioned circuitries.

The auxiliary circuitry 328 may comprise, for example, any one or more of: one or more processors having any number of processing cores; input/output circuitry; display driver circuitry; communications circuitry; and any other circuitry typically included as part of a CPU SoC. The one or more processors may comprise, for example, any one or more of: an image processing unit; a digital signal processing unit, which may, for example, be operable to implement video encoding/decoding functionality; a data processing unit.

The GPU 330, where provided, comprises a plurality of execution units 334 (such as, for example, any one of at least 128 EUs, at least 256 EUs, at least 512 EUs, at least 1024 EUs), power management circuitry 336, a memory controller 338 arranged to transmit data between the DRAM 332 and the plurality of the execution units 334, and a cache memory 339 having a plurality of memory units (e.g., banks).

Similarly to the computing device 110 of FIG. 1, the computing device 310 can receive electrical power from the battery 360 or from an alternating current (AC) power source 370 such as an AC mains supply (power grid).

The AC power source 370 is operable to selectively provide electrical power to the circuitries of the computing device 310, for example when the computing device 310 is connected to a mains power outlet, for example by an AC to DC transformer.

The battery 360 is operable to selectively provide electrical power to the circuitries of the computing device 310. The battery 360 may provide electrical power to the one or more of the circuitries of the computing device 310 when, for example, the computing device 310 is not operably coupled to the AC power source 370 e.g., when the computing device 310 is unplugged from a mains power outlet.

The circuitries of the computing device 310 may be arranged to receive electrical power from either the AC power source 370 (e.g., and not battery 360) or the battery 360 (e.g., and not the AC power source 370).

The battery 360 and the AC power source 370 may be selectively couplable to the circuitries of the computing device 310 via any suitable electrical coupling means and may be indirectly couplable to the circuitries of the computing device 310 through other circuitry such as, for example, one or more voltage regulators or any other suitable type of (e.g., regulating) circuitry.

In some examples, some or all of the circuities of the computing device 310 may be arranged to (e.g., selectively) receive at least one supply voltage and at least one clock signal. The at least one clock signal may be generated by, for example, one or more clock generating circuits, such, as, for example, one or more phase locked loops (not shown). The at least one clock signal may be distributed to the one or more circuitries of the computing device 310 (and some or all of the functional units thereof, where applicable) via e.g., a clock distribution network (which may also be referred to as a clock tree) (not shown).

The power management techniques disclosed herein, for example with respect to the processor or memory circuitry 120 of the computing device 110 of FIG. 1, are applicable to any one or more of: the CPU 320; the DRAM 324; the GPU 329 (when present); the GPU 330 (e.g., with respect to either the EUs of the GPU 330 or the cache memory 339 of the GPU 330); the DRAM 332; any one or more of the one or more processors of the auxiliary circuitry 328 (when present). For example, any one of the CPU 320, the DRAM 324, the GPU 329 (when present), the GPU 330, the DRAM 332, and one or more of the processors of the auxiliary circuitry 328 (when present) may correspond to the processor or memory circuitry 120 of FIG. 1 and may be arranged such that a number of their respective functional units arranged to receive operational electrical power is controlled depending on the type of power source (e.g., the AC power source 370 or the battery 360) from which they are receiving electrical power.

For example, the CPU 320 may correspond to the processor or memory circuitry 120. The CPU 320 may comprise a plurality of processing cores, wherein the plurality of processing cores of the CPU 320 correspond to the plurality of functional units of the processor or memory circuitry 120. In this case, the power management circuitry 322 may, based on an indication (e.g., received from the power management controller 340) that the CPU 320 is receiving electrical power from the AC power source 370, selectively cause operational electrical power to be provided to a first number of the processing cores of the plurality of processing cores and, based on an indication (e.g., received from the power management controller 340) that the CPU 320 is receiving electrical power from the battery 360, selectively cause operational electrical power to be provided to a second number of the processing cores of the plurality of processing cores, the second number being less than the first number.

In some examples, the DRAM 324 may correspond to the processor or memory circuitry 120 of FIG. 1, and the plurality of memory units (e.g., banks) of the DRAM 324 may correspond to the plurality of functional units of the processor or memory circuitry 120. In this case, the power management circuitry 322 may, based on an indication (e.g., received from the power management controller 340) that the DRAM 324 is receiving electrical power from the AC power source 370, selectively cause operational electrical power to be provided to a first number of memory banks of the DRAM 324 and, based on an indication (e.g., received from the power management controller 340) that the DRAM 324 is receiving electrical power from the battery 360, selectively cause operational electrical power to be provided to a second number of the memory units (e.g., banks) of the DRAM 324, the second number being less than the first number.

In some examples, the GPU 329 may correspond to the processor or memory circuitry 120 of FIG. 1, and the plurality of execution units of the GPU 329 may correspond to the plurality of functional units of the processor or memory circuitry 120. In this case, the power management circuitry 322 may, based on an indication (e.g., received from the power management controller 340) that the GPU 329 is receiving electrical power from the AC power source 370, selectively cause operational electrical power to be provided to a first number of the execution units of the GPU 329 and, based on an indication (e.g., received from the power management controller 340) that the GPU 329 is receiving electrical power from the battery 360, selectively cause operational electrical power to be provided to a second number of the execution units of the GPU 329, the second number being less than the first number.

In some examples, the GPU 330 may correspond to the processor or memory circuitry 120 of FIG. 1, and the plurality of execution units of the GPU 330 may correspond to the plurality of functional units of the processor or memory circuitry 120. In this case, the power management circuitry 336 may, based on an indication (e.g., received from the power management controller 340) that the GPU 330 is receiving electrical power from the AC power source 370, selectively cause operational electrical power to be provided to a first number of the execution units of the GPU 330 and, based on an indication (e.g., received from the power management controller 340) that the GPU 330 is receiving electrical power from the battery 360, selectively cause operational electrical power to be provided to a second number of the execution units of the GPU 330, the second number being less than the first number.

In some examples, the embedded memory 337 of the GPU 330 may correspond to the processor or memory circuitry 120 of FIG. 1, and the plurality of memory units (e.g., banks) of the embedded memory 337 may correspond to the plurality of functional units of the processor or memory circuitry 120. In this case, the power management circuitry 334 may, based on an indication (e.g., received from the power management controller 340) that the embedded memory 337 is receiving electrical power from the AC power source 370, selectively cause operational electrical power to be provided to a first number of memory units (e.g., banks) of the embedded memory 337 and, based on an indication that the embedded memory 337 is receiving electrical power from the battery 360, selectively cause operational electrical power to be provided to a second number of the memory units (e.g., banks) of the embedded memory 337, the second number being less than the first number.

In some examples, the cache memory 339 of the GPU 330 may correspond to the processor or memory circuitry 120 of FIG. 1, and the plurality of memory units (e.g., banks) of the cache memory 339 may correspond to the plurality of functional units of the processor or memory circuitry 120. In this case, the power management circuitry 334 may, based on an indication (e.g., received from the power management controller 340) that the cache memory 339 is receiving electrical power from the AC power source 370, selectively cause operational electrical power to be provided to a first number of memory units of the cache 339 and, based on an indication that the cache memory 339 is receiving electrical power from the battery 360, selectively cause operational electrical power to be provided to a second number of the memory units (e.g., banks) of the cache 339, the second number being less than the first number.

In some examples, any one of the one or more processors of the auxiliary circuitry 328 (when present) may correspond to the processor or memory circuitry 120. In these examples, the any one of the one or more processors may comprise a plurality of processing cores, wherein the plurality of processing cores correspond to the plurality of functional units of the processor or memory circuitry 120. In this case, the power management circuitry 322 may, based on an indication (e.g., received from the power management controller 340) that the any one of the one or more processors is receiving electrical power from the AC power source 370, selectively cause operational electrical power to be provided to a first number of the processing cores of the plurality of processing cores and, based on an indication (e.g., received from the power management controller 340) that the any one of the one or more processors is receiving electrical power from the battery 360, selectively cause operational electrical power to be provided to a second number of the processing cores of the plurality of processing cores, the second number being less than the first number.

In some examples, the DRAM 332 may correspond to the processor or memory circuitry 120, and the plurality of memory banks of the DRAM 332 may correspond to the plurality of functional units of the processor or memory circuitry 120. In this case, the power management circuitry 336 may, based on the indication (e.g., received from the power management controller 340) that the DRAM 334 is receiving electrical power from the AC power source 370, selectively cause operational electrical power to be provided to a first number of the memory units (e.g., banks) of the DRAM 334 and, based on an indication (e.g., received from the power management controller 340) that the DRAM 334 is receiving electrical power from the battery 340, selectively cause operational electrical power to be provided to a second number of memory units (e.g., banks) of the DRAM 334, the second number being less than the first number.

As discussed above with respect to the computing device 110, the first number of functional units (e.g., the first number of memory units (e.g., banks), execution units, or processing cores in the examples above) may be a predetermined (e.g., fixed) number. The first number may comprise all of the functional units of the respective circuitry or a subset of the functional units of the respective circuitry.

As discussed above with respect to the computing device 110, the second number of functional units (e.g., the second number of memory units (e.g., banks), execution units, or processing cores in the examples above) may be a predetermined (e.g., fixed) number. For example, the second number of the said functional units may comprise a predetermined number, the predetermined number comprising any number smaller than the first number of the functional units. In some examples, the predetermined number may be stored in, for example, the flash 350, which may be communicatively coupled to one or both of the power management circuitry 332 and the power management circuitry 334. The predetermined (e.g., fixed) number may be determined based on characterisation data, the characterisation data characterising performance of one or more of the CPU 320, the DRAM 324, the GPU 329, the GPU 330, the DRAM 332, the cache memory 339, and any one of the one or more processors of the auxiliary circuitry 328 (when present) as a function of power consumption by the respective circuitries for different numbers of operational functional units thereof. In some examples, the characterisation data may be stored in, for example, the flash memory 350. As discussed above with respect to the computing device 110 of FIG. 1, in some examples, the value of the second number may depend on one or both of the capacity and present charge state of the battery. For example, the value of the second number may be variable, for example depending on an indication of battery capacity or present battery charge state (e.g., received from the power management controller 340).

It will be understood that, in any of the above cases, as discussed above in respect of the computing device 110 of FIG. 1, the respective power management circuitry may, based on an indication that the respective circuitry is receiving electrical power from the battery 140, and based on an indication that a charge state of the battery 140 is less than or equal to a predetermined threshold, reduce a number of the functional units arranged to receive operational electrical power from the second number to a third number, the third number being less than the second number.

Similarly, it will be understood that when the charge state of the battery increases, for example above the threshold, the power management circuitry may be to increase the number of functional units arranged to receive operational electrical power from the third number, for example back to the second number. It will also be understood that, depending on an indication that the respective circuitry is receiving electrical power from the AC power source 370 rather than the battery 360, the power management circuitry may be to increase the number of functional units arranged to receive operational electrical power from the second number, for example to the first number.

In examples wherein a processor of the computing device 310, such as any one of the CPU 320, the GPU 329, the GPU 330, or any one of the one or more processors of the auxiliary circuitry 328, prior to reducing a number of the processing cores of the processor arranged to receive operational electrical power from the first number to the second number, one or more pipelines (e.g., one or more instruction queues) associated with the processing cores of the processor which are to be disabled (i.e., have their respective provision of operational power disabled) may be pre-empted i.e., the pipeline may be prevented from receiving further instructions and the existing instruction(s) of the pipelines may be executed by the processing cores of the processor which are to be disabled, prior to their disablement.

The circuitry of the computing device 310 illustrated in FIG. 3 has been simplified for the sake of clarity, and the computing device 310 may comprise conventional components of a computing device not shown in FIG. 3, such as but not limited to, for example: voltage regulation circuitry, clock distribution circuitry, input/output circuitry, communications circuitry, and one or more peripherals such as, for example, a display.

Figure 4:
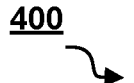
FIGS. 4 and 5 are example flowcharts illustrating methods for managing a power consumption of processor or memory circuitry of a computing device.
Figure 4:
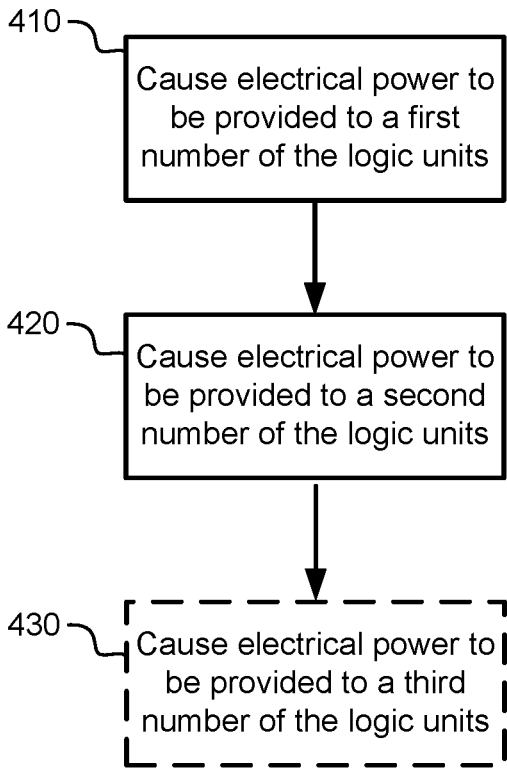

FIG. 4 depicts a flow chart 400 schematically illustrating controlling a power consumption of processor or memory circuitry of a computing device, the processor or memory circuitry comprising a plurality of functional units. The computing device may comprise, for example, the computing device 110 shown in FIG. 1, the computing device 310 shown in FIG. 3, or any other suitable computing device. The processor or memory circuitry may comprise, for example, any one of the processor or memory circuitry 110 shown in FIG. 1, the CPU 320 shown in FIG. 3, the DRAM 324 shown in FIG. 3, the GPU 329 shown in FIG. 3, the GPU 330 shown in FIG. 3, the DRAM 332 shown in FIG. 3, the embedded memory 337 shown in FIG. 3, the cache memory 339 shown in FIG. 3, any one of the one or more processors of the auxiliary circuitry 328 shown in FIG. 3, or any other type of processor or memory circuitry. Flow chart 400 may be performed by, for example, the power management circuitry 130 shown in FIG. 1, the power management circuitry 322 shown in FIG. 3, the power management circuitry 336 shown in FIG. 3, or any other suitable power management circuitry.

At block 410, based on an indication that the processor or memory circuitry is receiving electrical power from an AC power source, provision of operational electrical power to a first number of the functional units of the processor or memory circuitry is selectively caused. The AC power source may comprise any type of AC power source, including, for example, any type of AC power source disclosed herein. The AC power source may correspond to, for example, the AC power source 150 shown in FIG. 1 or the AC power source 370 shown in FIG. 3. The said indication may be received, for example from a power management controller of the computing device, in accordance with examples disclosed herein. The provision of the operational electrical power to the first number of the functional units may be selectively caused in accordance with examples disclosed herein (e.g., by switching gates associated with the first number of functional units).

At block 420, based on an indication that the processor or memory circuitry is receiving electrical power from a battery of the computing device, provision of operational electrical power to a second number of the functional units of the processor or memory circuitry is selectively caused, wherein the second number is less than the first number. The battery may comprise any type of battery, including, for example, any type of battery disclosed herein. The battery may correspond to, for example, the battery 140 shown in FIG. 1 or the battery 360 shown in FIG. 3. The said indication may be received, for example from a power management controller of the computing device, in accordance with examples disclosed herein. The provision of the operational electrical power to the second number of the functional units may be selectively caused in accordance with any example disclosed herein, for example by selectively switching gates associated with the second number of the functional units (e.g. and selectively switching gates associated with other functional units of the circuitry). For example, the provision of the operational electrical power to the second number of the functional units may be selectively caused (e.g., operational electrical power having initially been provided to the first number of the functional units) by selectively disabling the provision of a supply voltage to at least a subset of the first number of the functional units, by selectively disabling one or more portions of infrastructural circuitry (such as one or more clock branches of a clock tree) associated with, such as to selectively disable provision of a clock signal to, at least a subset of the first number of the functional units, or by both selectively disabling the provision of a supply voltage to at least a subset of the first number of the functional units and selectively disabling one or more portions of infrastructural circuitry associated with at least a subset of the first number of the functional units, in accordance with examples disclosed herein.

In examples wherein the processor or memory circuitry comprises a processor, such as, for example, any type of processor disclosed herein or any other type of suitable processor, prior to reducing a number of the processing cores of the processor arranged to receive operational electrical power (e.g., from the first number to the second number or from the second number to the first number-see below), one or more pipelines (e.g., one or more instruction queues) associated with the processing cores of the processor which are to be disabled (i.e., have their respective provision of operational power disabled) may be pre-empted i.e., the pipeline may be prevented from receiving further instructions and the existing instruction(s) of the pipelines may be executed by the processing cores of the processor which are to be disabled, prior to their disablement.

In some examples, the method of flowchart 400 further comprises block 430. At block 430, subsequent to the provision of operational electrical power to the second number of the function units (e.g., in response to the computing device having switched from AC power to battery power), a number of functional blocks of the processor or memory circuitry arranged to receive operational electrical power from the battery may be reduced based on an indication that a charge state of the battery is less than or equal to a predetermined threshold. For example, based on the indication that the processor or memory circuitry is receiving electrical power from the battery and based on an indication that a charge state of the battery is less than or equal to a predetermined threshold, the number of the functional units of the processor or memory circuitry arranged to receive electrical power may be reduced from the second number to a third number, the third number being less than the second number. The said indication may be received, for example from a power management controller of the computing device, in accordance with examples disclosed herein. The number of functional units of the processor or memory circuitry arranged to receive operational electrical power may be reduced in accordance with examples disclosed herein, for example by selectively switching one or more gates associated with the third number of functional units (and e.g., selectively switching one or more gates associated with other functional units of the circuitry).

In some examples, following scaling of the size of the processor or memory circuitry (i.e., changing the number of functional units arranged to receive operational electrical power e.g., from the first number of the functional units to the second number of the functional units at block 420 or from the second number of the functional units to the third number of the functional units at block 430, or from the third number to the second number or from the second number to the first number), data indicative of a current size (i.e., a current number of operational functional units) of the processor or memory circuitry is updated in accordance with examples disclosed herein.

In some examples, a power budget for the processor or memory circuitry may depend on whether the processor or memory circuitry is receiving electrical power from an AC power source or from a battery. In some examples, the power budget may further depend on a capacity of a battery from which the processor or memory circuitry is receiving electrical power. In some examples, the power budget may further depend on a charge state of a battery from which the processor or memory circuitry is receiving electrical power. In some examples, the method of flow chart 400 may further comprising setting the power budget for the processor or memory circuitry accordingly. The method may further comprise operating the circuitry in accordance with the set power budget (i.e., with a power consumption within the set power budget).

Figure 5:
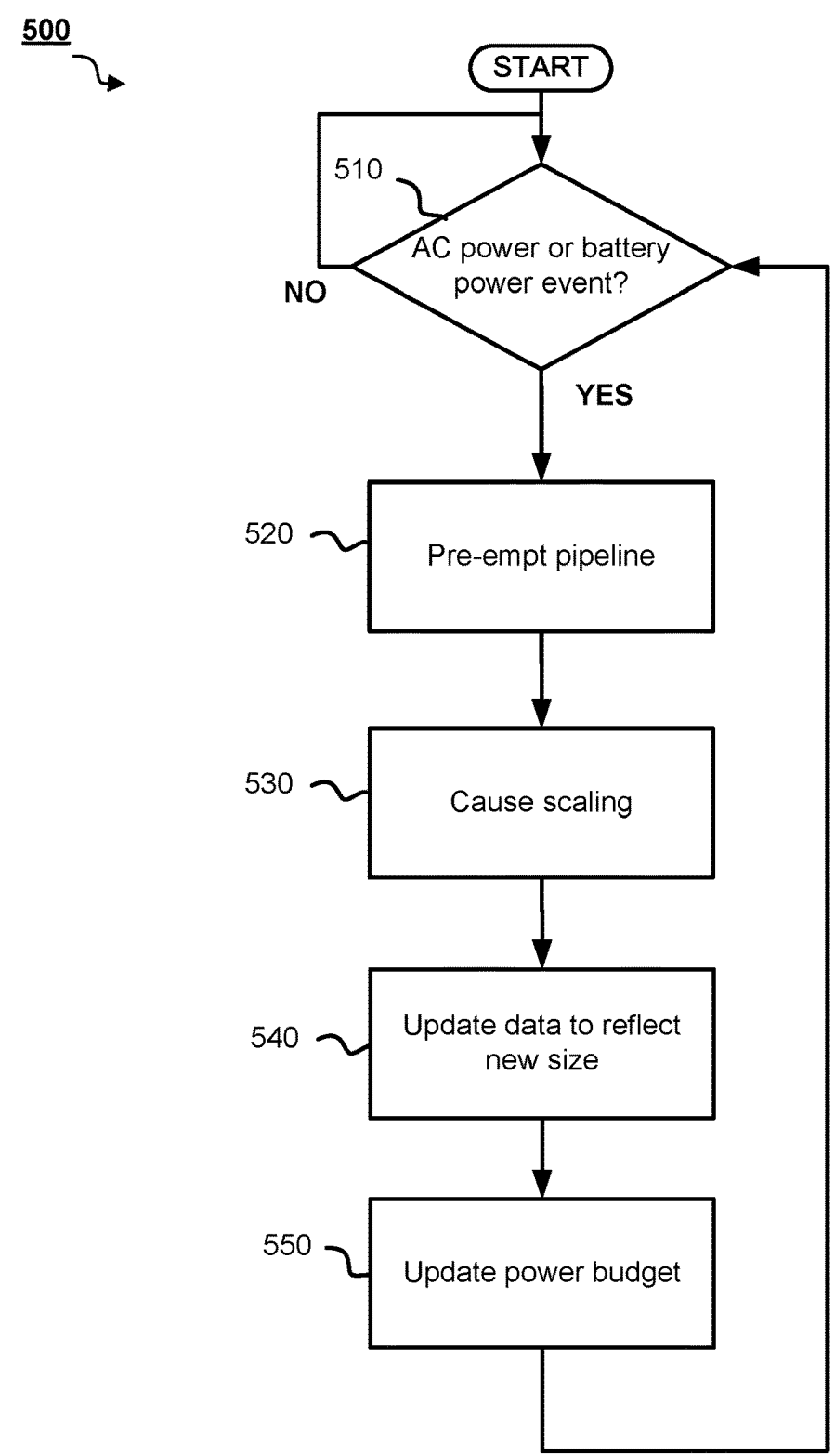

FIG. 5 depicts a flow chart 500 schematically illustrating a method of controlling a power consumption of processor or memory circuitry of a computing device, the processor or memory circuitry comprising a plurality of functional units. The computing device may comprise, for example, the computing device 110 shown in FIG. 1, the computing device 310 shown in FIG. 3, or any other computing device. The processor or memory circuitry may comprise, for example, any one of the processor or memory circuitry 120 shown in FIG. 1, the CPU 320 shown in FIG. 3, the DRAM 324 shown in FIG. 3, the GPU 329 shown in FIG. 3, the GPU 330 shown in FIG. 3, the DRAM 332 shown in FIG. 3, the cache memory 339 shown in FIG. 3, any one of the one or more processors of the auxiliary circuitry 328 shown in FIG. 3, or any other type of processor or memory circuitry. Flow chart 500 may be performed by, for example, the power management circuitry 130 shown in FIG. 1, the power management circuitry 322 shown in FIG. 3, the power management circuitry 336 shown in FIG. 3, or any other power management circuitry.

At block 510, it is determined if a power source providing electrical power to the processor or memory circuitry has changed e.g., from an AC power source (such as the AC power source 150 shown in FIG. 1 or the AC power source 370 shown in FIG. 3, for example) to a battery (such as the battery 140 shown in FIG. 1 or the battery 360 shown in FIG. 3, for example), or vice versa. The said determination may be based on, for example, an indication of the type of power source from which the processor or memory circuitry is receiving electrical power (e.g., at a present time) compared to one or more previous indications of the type of power source from which the processor or memory circuitry was receiving power (e.g., at one or more previous times). If it is determined the power source providing electrical power to the processor or memory circuitry has changed, the flow-chart 500 may proceed to block 520. If it is determined the power source providing electrical power to the processor or memory circuitry has not changed, the flowchart 500 may loop back to block 510.

At block 520, in examples where the circuitry 120 comprises a processor, one or more pipelines (e.g., one or more instruction queues) associated with the processing cores of the processor which are to be disabled may be pre-empted as discussed above with respect to FIG. 1, FIG. 3 and FIG. 4.

At block 530, a number of the functional units of the memory or processor circuitry arranged to receive operational electrical power may be controlled in accordance with examples disclosed herein. For example, if it is determined at block 510 that the power source providing electrical power to the processor or memory circuitry has changed from the AC power source to the battery, a number of the functional units of the memory or processor circuitry arranged to receive operational electrical power may be reduced from a first number to a second number, the second number being less than the first. Provision of operational electrical power to the second number of the functional units may be caused, for example by selectively switching one or more gates associated with the respective functional units of the circuitry, in accordance with examples disclosed herein. For example, one or more gates configured to control operational power delivery from the battery to the respective functional units of the processor or memory circuitry may be switched. For example, the provision of the operational electrical power to the reduced, second number of the functional units may be selectively caused by selectively disabling the provision of a supply voltage to at least a subset of the first number of the functional units, by selectively disabling one or more portions of infrastructural circuitry (such as one or more clock branches of a clock tree) associated with, such as to selectively disable provision of a clock signal to, at least a subset of the first number of the functional units, or by both selectively disabling the provision of a supply voltage to at least a subset of the first number of the functional units and selectively disabling one or more portions of infrastructural circuitry associated with at least a subset of the first number of the functional units, in accordance with examples disclosed herein. In examples where it is determined at block 510 that the power source providing electrical power to the processor or memory circuitry has changed from the battery to the AC power source, a number of the functional units of the memory or processor circuitry arranged to receive operational electrical power may be increased from the second number, for example to the first number. Provision of operational electrical power to the increased number of the functional units may be caused in accordance with examples disclosed herein (e.g., by enabling a supply voltage to the first number of functional units and infrastructural circuitry associated therewith, e.g., to provide clock signals to the functional units). For example, one or more power more gates configured to control operational power delivery from the AC power source to the respective functional units of the processor or memory circuitry may be switched.

At block 540, data indicative of a current size (i.e., a current number of operational functional units) of the processor or memory circuitry may be updated to reflect the change in the number of operational functional units due to the scaling. The data indicative of the current size of the processor or memory circuitry may be stored in a memory, such as, for example, RAM, or any other type of memory. The data indicated of the current size of the processor or memory circuitry may be updated by, for example, a driver of the computing device.

At block 550, the power budget for the processor or memory circuitry is updated to reflect a current type of power source providing electrical power to the processor or memory circuitry. The power budget may be set in accordance with examples disclosed herein. The circuitry may then be operated in accordance with the set power budget (e.g., with a power consumption within the power budget). The method may return to block 510 and blocks 510-550 may be repeated.

In this specification, the phrase "at least one of A or B" and the phrase "at least one of A and B" should be interpreted to mean any one or more of the plurality of listed items A, B, etc., taken jointly and severally in any and all permutations.

Circuitry may be implemented, for example, as a hardware circuit comprising processors, microprocessors, circuits, circuit elements (e.g., transistors, resistors, capacitors, inductors, and so forth), integrated circuits, application specific integrated circuits, programmable logic devices, digital signal processors, field programmable gate arrays, logic gates, registers, semiconductor devices, chips, microchips, chip sets, and the like.

The configuration of circuitry to perform a specified function may be limited exclusively to hardware, limited exclusively to software, or a combination of hardware modification and software execution unless otherwise specified. Program instructions may be used to configure the logic gates of general purpose or special purpose processor circuitry to perform a processing function.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The power management circuitry 130, the power management circuitry 322, and the power management circuitry 336 described herein may be implemented in whole or in part by machine-readable program instructions. Machine-readable program instructions may be provided on a transitory medium, such as a transmission medium, or on a non-transitory medium, such as a storage medium. These machine-readable instructions (computer program code) may be implemented in a high level procedural or object oriented programming language. However, the program(s) may be implemented in assembly or machine language, if desired. In any case, the language may be a compiled or interpreted language, and combined with hardware implementations.

Examples of the present disclosure are applicable for use with all types of semiconductor integrated circuit (IC) chips. Examples of these IC chips include but are not limited to processors, controllers, chipset components, programmable logic arrays, memory chips, and network chips. One or more of the components described herein may be embodied as a System On Chip (SOC) device. A SOC may include, for example, one or more Central Processing Unit cores, one or more Graphics Processing Unit cores, an Input/Output interface, and a memory controller. In some examples, a SOC and its components may be provided on one or more integrated circuit die; for example, they may be packaged into a single semiconductor device.

The disclosure also extends to the following examples.

Example 1: An apparatus for managing a power consumption of processor or memory circuitry comprising a plurality of processing or memory functional units, the processor or memory circuitry arranged to receive electrical power from an alternating current, AC, power source or a battery, the apparatus comprising processing circuitry to: based on an indication that the processor or memory circuitry is receiving electrical power from the AC power source, selectively cause operational electrical power to be provided to a first number of the functional units of the processor or memory circuitry (i.e., the operational electrical power to be provided to the first number of functional units by the AC power source); and based on an indication that the processor or memory circuitry is receiving electrical power from the battery, selectively cause operational electrical power to be provided to a second number of the functional units of the processor or memory circuitry, the second number being less than the first number (i.e., the operational electrical power to be provided to the second number of functional units by the battery).

Example 2: The apparatus of Example 1, wherein by the second number being less than the first number, one or both of a static power consumption and an infrastructural power consumption of the processor or memory circuitry is reduced when the processor or memory circuitry is receiving operational electrical power from the battery (i.e., reduced compared to when the first number of functional units of the processor or memory circuitry is receiving operational electrical power from the AC power source).

Example 3: The apparatus of Example 1 or Example 2, wherein the second number of the functional units comprises or consists of a subset of the first number of the functional units.

Example 4: The apparatus of any preceding example, wherein the processor or memory circuitry comprises a processor, and the plurality of functional units comprises a plurality of processing cores, wherein the processing circuitry of the apparatus is to: based on the indication that the processor is receiving electrical power from the AC power source, selectively cause operational electrical power to be provided to the first number of the processing cores (i.e., the operational electrical power to be provided to the first number of processing cores by the AC power source); and based on an indication that the processor is receiving electrical power from the battery, selectively cause operational electrical power to be provided to the second number of the processing cores (i.e., the operational electrical power to be provided to the second number of processing cores by the battery).

Example 5: The apparatus of Example 4, wherein the processor comprises any one of: a central processing unit, CPU; a graphics processing unit, GPU; an image processing unit; a digital signal processing unit; a data processing unit.

Example 6: The apparatus of Example 4 or Example 5, wherein processing cores (e.g., processing cores to which operational electrical power is selectively provided) of the plurality of processing cores are operable to execute instructions in parallel from a common workload.

Example 7: The apparatus of Example 6, wherein the processor comprises a graphics processing unit, the plurality of processing cores corresponding to a plurality of execution units of the graphics processing unit.

Example 8: The apparatus of any preceding example, wherein the processor or memory circuitry comprises a graphics processing unit, GPU, and the plurality of functional units comprises a plurality of execution units, wherein the processing circuitry of the apparatus is to: based on the indication that the GPU is receiving electrical power from the AC power source, selectively cause operational electrical power to be provided to the first number of the execution units (i.e., the operational electrical power to be provided to the first number of execution units by the AC power source); and based on an indication that the GPU is receiving electrical power from the battery, selectively cause operational electrical power to be provided to the second number of the execution units (i.e., the operational electrical power to be provided to the second number of execution units by the battery).

Example 9: The apparatus of any preceding example, wherein the processor or memory circuitry comprises a memory circuitry and the plurality of functional units comprises a plurality of memory units, wherein the processing circuitry of the apparatus is to: based on the indication that the memory circuitry is receiving electrical power from the AC power source, selectively cause electrical power to be provided to the first number of the memory units (i.e., the operational electrical power to be provided to the first number of memory units by the AC power source); and based on an indication that the memory circuitry is receiving electrical power from the battery, selectively cause electrical power to be provided to the second number of the memory units (i.e., the operational electrical power to be provided to the second number of memory units by the battery).

Example 10: The apparatus of Example 9, wherein the memory circuitry is an embedded memory of a discrete graphics processing unit, GPU.

Example 11: The apparatus of any preceding example, wherein the functional units of the processor or memory circuitry reside in a common package.

Example 12: The apparatus of any one of Examples 1-10, wherein the functional units of the processor or memory circuitry reside in a plurality of packages, wherein the packages of the plurality of packages are thermally coupled to each other.

Example 13: The apparatus of Example 12, wherein the packages of the plurality of packages are to operate with a combined power consumption less than or equal to a power budget of (e.g., allocated to) the processor or memory circuitry.

Example 14: The apparatus of any preceding example, wherein a value of the second number is determined (e.g., by the processing circuitry) based on an indication of a capacity of the battery (e.g., the value of the second number depends on a capacity of the battery).

Example 15: The apparatus of Example 14, wherein the capacity of the battery comprises a nominal capacity of the battery when fully charged.

Example 16: The apparatus of any preceding example, wherein a value of the second number is determined (e.g., by the processing circuitry) based on an indication of a charge state of the battery (e.g., the value of the second number depends on the charge state of the battery).

Example 17: The apparatus of any preceding example, wherein the processing circuitry of the apparatus is to: based on the indication that the processor or memory circuitry is receiving electrical power from the battery, set a supply voltage provided to the second number of the functional units and a clock frequency of the second number of the functional units to provide an improved performance of the processor or memory circuitry relative to a performance obtainable by the first number of the functional units (e.g., the first number of functional units receiving operational electrical power from the battery) based on a power budget for (e.g., allocated to) the processor or memory circuitry when the processor or memory circuitry is receiving electrical power from the battery.

Example 18: The apparatus of Example 17, wherein a product of the second number and the clock frequency provided to the second number of functional units is greater than a product of the first number and a maximum clock frequency for the first number of the functional units, the maximum clock frequency for the first number of the functional units being based on the power budget for (e.g., allocated to) the processor or memory circuitry when the processor or memory circuitry is receiving electrical power from the battery (e.g., and based on the first number of functional units receiving operational electrical power from the battery).

Example 19: The apparatus of Example 17 or Example 18, wherein by the second number being less than the first number, one or both of a static power consumption and an infrastructural power consumption of the processor or memory circuitry is reduced when the processor or memory circuitry is receiving electrical power from the battery (i.e., reduced compared to when the first number of functional units of the processor or memory circuitry is receiving operational electrical power from the AC power source), and wherein the improved performance is based on using at least part of a power saved by the one or both of the reduced static power consumption and the reduced infrastructural power consumption to provide (e.g., operational) electrical power to the second number.

Example 20: The apparatus of any preceding example wherein the processing circuitry of the apparatus is to: based on the indication that the processor or memory circuitry is receiving electrical power from the battery and based on an indication that a charge state of the battery is less than or equal to a predetermined threshold, selectively cause operational electrical power to be provided to a third number of the functional units of the processor or memory circuitry, the third number being less than the second number (i.e., the operational electrical power to be provided to the third number of functional units by the battery).

Example 21: The apparatus of any preceding example, wherein to selectively cause operational electrical power to be provided to the first number of the functional units and to selectively cause operational electrical power to be provided to the second number of the functional units, the processing circuitry of the apparatus is to: selectively control one or more gates configured to control power delivery to the respective functional units of the processor or memory circuitry.

Example 22: The apparatus of any preceding example, wherein to selectively cause operational electrical power to be provided to the second number of the functional units (e.g., wherein to selectively reduce the number of functional units receiving electrical power from the first number to the second number based on an indication that the processor or memory circuitry has switched from receiving operational electrical power from the AC power source to receiving operational electrical power from the battery), the processing circuitry of the apparatus is to: disable a provision of a supply voltage to at least a subset of the first number of the functional units when the processor or memory circuitry is receiving electrical power from the battery.

Example 23: The apparatus of Example 22, wherein to disable the provision of the supply voltage to at least the subset of the first number of the functional units, the processing circuitry of the apparatus is to: switch one or more gates configured to control delivery of the supply voltage to the at least the subset of the first number of the functional units.

Example 24: The apparatus of Example 22 or Example 23, wherein disabling the provision of the supply voltage to at least the subset of the first number of the functional units reduces a static power consumption of the processor or memory circuitry.

Example 25: The apparatus of any preceding example, wherein to selectively cause operational electrical power to be provided to the second number of the functional units (e.g., wherein to selectively reduce the number of functional units receiving electrical power from the first number to the second number based on an indication that the processor or memory circuitry has switched from receiving operational electrical power from the AC power source to receiving operational electrical power from the battery), the processing circuitry of the apparatus is to: disable one or more portions of infrastructural circuitry of the processor or memory circuitry, the one or more portions of the infrastructural circuitry being operably coupled to at least a subset of the first number of the functional units.

Example 26: The apparatus of Example 25, wherein to disable the one or more portions of the infrastructural circuitry, the processing circuitry of the apparatus is to: switch one or more gates configured to control delivery of electrical power to the one or more portions of the infrastructural circuitry.

Example 27: The apparatus of any preceding example, wherein to selectively cause operational electrical power to be provided to the second number of the functional units (e.g., wherein to selectively reduce the number of functional units receiving electrical power from the first number to the second number based on an indication that the processor or memory circuitry has switched from receiving operational electrical power from the AC power source to receiving operational electrical power from the battery), the processing circuitry of the apparatus is to: disable provision of a clock signal to at least a subset of the first number of the functional units.

Example 28: The apparatus of any one of Examples 25-27, wherein the infrastructural circuitry comprises clock distribution circuitry arranged to provide a clock signal to respective functional units of the processor or memory circuitry, and wherein to selectively cause operational electrical power to be provided to the second number of the functional units (e.g., to selectively reduce the number of functional units receiving electrical power from the first number to the second number based on an indication that the processor or memory circuitry has switched from receiving operational electrical power from the AC power source to receiving operational electrical power from the battery), the processing circuitry of the apparatus is to: disable at least a portion of the clock distribution circuitry operable to deliver the clock signal to the at least the subset of the first number of the functional units.

Example 29: The apparatus of Example 28, wherein to disable the at least the portion of the clock distribution circuitry, the processing circuitry of the apparatus is to: switch one or more gates configured to control delivery of the clock signal to the at least the portion of the clock distribution circuitry.

Example 30: The apparatus of any one of Examples 25-29, wherein disabling the one or more portions of the infrastructural circuitry reduces an infrastructural power consumption of the processor or memory circuitry when the processor or memory circuitry is receiving electrical power from the battery.

Example 31: The apparatus of any preceding example, wherein the processor or memory circuitry is processor or memory circuitry of any one of: a laptop computing device; a tablet computing device; a smartphone.

Example 32: The apparatus of any preceding example further comprising a memory (such as a memory storing instructions executable by the processing circuitry to perform the functionality of the processing circuitry set out herein).

Example 33: The apparatus of Example 32, wherein the memory stores instructions executable by the processing circuitry to selectively cause the operational electrical power to be provided to the first number of the functional units of the processor or memory circuitry based on an indication that the processor or memory circuitry is receiving electrical power from the AC power source and selectively cause the operational electrical power to be provided to the second number of the functional units of the processor or memory circuitry based on an indication that the processor or memory circuitry is receiving electrical power from the battery.

Example 34: A computing device comprising the apparatus of any one of Examples 1-33.

Example 35: The computing device of Example 34, wherein the computing device is any one of: a laptop computing device; a tablet computing device; a smartphone.

Example 36: Means for managing a power consumption of processor or memory circuitry comprising a plurality of processing or memory functional units, the processor or memory circuitry arranged to receive electrical power from an alternating current, AC, power source or a battery, comprising: means for, based on an indication that the processor or memory circuitry is receiving electrical power from the AC power source, selectively causing operational electrical power to be provided to a first number of the functional units of the processor or memory circuitry (i.e., the operational electrical power to be provided to the first number of functional units by the AC power source); and means for, based on an indication that the processor or memory circuitry is receiving electrical power from the battery, selectively causing operational electrical power to be provided to a second number of the functional units of the processor or memory circuitry, the second number being less than the first number (i.e., the operational electrical power to be provided to the second number of functional units by the battery).

Example 37: A method of managing a power consumption of processor or memory circuitry comprising a plurality of processing or memory functional units, the processor or memory circuitry arranged to receive electrical power from an alternating current, AC, power source or a battery, the method comprising: based on an indication that the processor or memory circuitry is receiving electrical power from the AC power source, selectively causing operational electrical power to be provided to a first number of the functional units of the processor or memory circuitry (i.e., the operational electrical power to be provided to the first number of functional units by the AC power source); and based on an indication that the processor or memory circuitry is receiving electrical power from the battery, selectively causing operational electrical power to be provided to a second number of the functional units of the processor or memory circuitry, the second number being less than the first number (i.e., the operational electrical power to be provided to the second number of functional units by the battery).

Example 38: The method of Example 37, wherein by the second number being less than the first number, one or both of a static power consumption and an infrastructural power consumption of the processor or memory circuitry is reduced when the processor or memory circuitry is receiving electrical power from the battery.

Example 39: The method of Example 37 or Example 38, wherein the second number of the functional units comprises or consists of a subset of the first number of the functional units.

Example 40: The method of any one of Examples 37-39, wherein the processor or memory circuitry comprises a processor, and the plurality of functional units comprises a plurality of processing cores, wherein the method comprises: based on the indication that the processor is receiving electrical power from the AC power source, selectively causing operational electrical power to be provided to the first number of the processing cores (i.e., the operational electrical power to be provided to the first number of processing cores by the AC power source); and based on an indication that the processor is receiving electrical power from the battery, selectively causing operational electrical power to be provided to the second number of the processing cores (i.e., the operational electrical power to be provided to the second number of processing cores by the battery).

Example 41: The method of Example 40, wherein the processor comprises any one of: a central processing unit, CPU; a graphics processing unit, GPU; an image processing unit; a digital signal processing unit; a data processing unit.

Example 42: The method of Example 40 or Example 41, wherein processing cores (e.g., processing cores to which operational electrical power is selectively provided) of the plurality of processing cores are operable to execute instructions in parallel from a common workload.

Example 43: The method of Example 42, wherein the processor comprises a graphics processing unit, the plurality of processing cores corresponding to a plurality of execution units of the graphics processing unit.

Example 44: The method of any one of Examples 37-43, wherein the processor or memory circuitry comprises a graphics processing unit, GPU, and the plurality of functional units comprises a plurality of execution units, wherein the method comprises: based on the indication that the GPU is receiving electrical power from the AC power source, selectively causing operational electrical power to be provided to the first number of the execution units (i.e., the operational electrical power to be provided to the first number of execution units by the AC power source); and based on an indication that the GPU is receiving electrical power from the battery, selectively causing operational electrical power to be provided to the second number of the execution units (i.e., the operational electrical power to be provided to the second number of execution units by the battery).

Example 45: The method of any one of Examples 37-44, wherein the processor or memory circuitry comprises a memory circuitry and the plurality of functional units comprises a plurality of memory units, wherein the method comprises: based on the indication that the memory circuitry is receiving electrical power from the AC power source, selectively causing electrical power to be provided to the first number of the memory units (i.e., the operational electrical power to be provided to the first number of memory units by the AC power source); and based on an indication that the memory circuitry is receiving electrical power from the battery, selectively causing electrical power to be provided to the second number of the memory units (i.e., the operational electrical power to be provided to the second number of memory units by the battery).

Example 46: The method of Example 45, wherein the memory circuitry is an embedded memory of a discrete graphics processing unit, GPU.

Example 47: The method of any one of Examples 37-46, wherein the functional units of the processor or memory circuitry reside in a common package.

Example 48: The method of any one of Examples 37-46, wherein the functional units of the processor or memory circuitry reside in a plurality of packages, wherein the packages of the plurality of packages are thermally coupled to each other.

Example 49: The method of Example 48, wherein the packages of the plurality of packages are to operate with a combined power consumption less than or equal to a power budget of the processor or memory circuitry.

Example 50: The method of any one of Examples 37-49, comprising determining wherein a value of the second number is determined based on an indication of a capacity of the battery (e.g., the value of the second number depends on the capacity of the battery).

Example 51: The method of Example 50, wherein the capacity of the battery comprises a nominal capacity of the battery when fully charged.

Example 52: The method of any one of Examples 37-51, comprising determining a value of the second number on an indication of a charge state of the battery (e.g., the value of the second number depends on the charge state of the battery).

Example 53: The method of any one of Examples 37-52, further comprising: based on the indication that the processor or memory circuitry is receiving electrical power from the battery, setting a supply voltage provided to the second number of the functional units and a clock frequency of the second number of the functional units to provide an improved performance of the processor or memory circuitry relative to a performance obtainable by the first number of the functional units (e.g., the first number of functional units receiving operational electrical power from the battery) based on a power budget for (e.g., allocated to) the processor or memory circuitry when the processor or memory circuitry is receiving electrical power from the battery.

Example 54: The method of Example 53, wherein a product of the second number and the clock frequency provided to the second number of functional units is greater than a product of the first number and a maximum clock frequency for the first number of the functional units, the maximum clock frequency for the first number of the functional units being based on the power budget for (e.g., allocated to) the processor or memory circuitry when the processor or memory circuitry is receiving electrical power from the battery (e.g., and based on the first number of functional units receiving operational electrical power from the battery).

Example 55: The method of Example 53 or Example 54, wherein by the second number being less than the first number, one or both of a static power consumption and an infrastructural power consumption of the processor or memory circuitry is reduced when the processor or memory circuitry is receiving electrical power from the battery (i.e., reduced compared to when the first number of functional units of the processor or memory circuitry is receiving operational electrical power from the AC power source), and wherein the improved performance is based on using at least part of a power saved by the one or both of the reduced static power consumption and the reduced infrastructural power consumption to provide operational electric power to the second number of functional units.

Example 56: The method of any one of Examples 37-55, further comprising: based on the indication that the processor or memory circuitry is receiving electrical power from the battery and based on an indication that a charge state of the battery is less than or equal to a predetermined threshold, selectively causing operational electrical power to be provided to a third number of the functional units of the processor or memory circuitry, the third number being less than the second number (i.e., the operational electrical power to be provided to the third number of functional units by the battery).

Example 57: The method of any one of Examples 37-56, wherein selectively causing operational electrical power to be provided to the first number of the functional units and selectively causing operational electrical power to be provided to the second number of the functional units comprises selectively controlling one or more gates configured to control power delivery to the respective functional units of the processor or memory circuitry.

Example 58: The method of any one of Examples 37-57, wherein selectively causing operational electrical power to be provided to the second number of the functional units (e.g., wherein selectively reducing the number of functional units receiving electrical power from the first number to the second number based on an indication that the processor or memory circuitry has switched from receiving operational electrical power from the AC power source to receiving operational electrical power from the battery) comprises disabling a provision of a supply voltage to at least a subset of the first number of the functional units when the processor or memory circuitry is receiving electrical power from the battery.

Example 59: The method of Example 58, wherein disabling the provision of the supply voltage to at least the subset of the first number of the functional units comprises switching one or more gates configured to control delivery of the supply voltage to the at least the subset of the first number of the functional units.

Example 60: The method of Example 58 or Example 59, wherein disabling the provision of the supply voltage to at least the subset of the first number of the functional units reduces a static power consumption of the processor or memory circuitry.

Example 61: The method of any one of Examples 37-60, wherein selectively causing operational electrical power to be provided to the second number of the functional units (e.g., wherein selectively reducing the number of functional units receiving electrical power from the first number to the second number based on an indication that the processor or memory circuitry has switched from receiving operational electrical power from the AC power source to receiving operational electrical power from the battery) comprises disabling one or more portions of infrastructural circuitry of the processor or memory circuitry, the one or more portions of the infrastructural circuitry being operably coupled to at least a subset of the first number of the functional units.

Example 62: The method of Example 61, wherein disabling the one or more portions of the infrastructural circuitry comprises switching one or more gates configured to control delivery of electrical power to the one or more portions of the infrastructural circuitry.

Example 63: The method of any one of Examples 37-62, wherein selectively causing operational electrical power to be provided to the second number of the functional units (e.g., wherein selectively reducing the number of functional units receiving electrical power from the first number to the second number based on an indication that the processor or memory circuitry has switched from receiving operational electrical power from the AC power source to receiving operational electrical power from the battery) comprises disabling provision of a clock signal to at least a subset of the first number of the functional units.

Example 64: The method of any one of Examples 61-63, wherein the infrastructural circuitry comprises clock distribution circuitry arranged to provide a clock signal to respective functional units of the processor or memory circuitry, and wherein selectively causing operational electrical power to be provided to the second number of the functional units comprises disabling at least a portion of the clock distribution circuitry operable to deliver the clock signal to the at least the subset of the first number of the functional units.

Example 65: The method of Example 64, wherein disabling the at least the portion of the clock distribution circuitry comprises switching one or more gates configured to control delivery of the clock signal to the at least the portion of the clock distribution circuitry.

Example 66: The method of any one of Examples 61-65, wherein disabling the one or more portions of the infrastructural circuitry reduces an infrastructural power consumption of the processor or memory circuitry when the processor or memory circuitry is receiving electrical power from the battery.

Example 67: The method of any one of Examples 37-66, wherein the processor or memory circuitry is processor or memory circuitry of any one of: a laptop computing device; a tablet computing device; a smartphone.

Example 68: One or more (e.g., non-transitory) computer readable media comprising machine readable instructions which, when executed, perform the method according to any one of Examples 37-67.

Example 69: A computer program product comprising instructions which, when the program is executed by processing circuitry, cause the processing circuitry to perform the method of any one of Examples 37 to 67.

The invention claimed is:

1. An apparatus comprising:
a processor or memory circuitry; and
processing circuitry coupled to the processor or memory circuitry, the processing circuitry to:
    based on an indication that processor or memory circuitry is receiving electrical power from an AC power source, selectively cause operational electrical power to be provided to a first number of a plurality of functional units of the processor or memory circuitry;
    based on an indication that the processor or memory circuitry is receiving electrical power from a battery;
        selectively cause operational electrical power to be provided to a second number of the plurality of functional units of the processor or memory circuitry, the second number being less than the first number, wherein by the second number being less than the first number, one or both of a static power consumption and an infrastructural power consumption of the processor or memory circuitry is reduced when the processor or memory circuitry is receiving electrical power from the battery, and
        improving performance based on using at least part of a power saved by the one or both of the reduced static power consumption and the reduced infrastructural power consumption to provide electrical power to the second number of the plurality of functional units.

2. The apparatus of claim 1, wherein the second number of the functional units comprises or consists of a subset of the first number of the functional units.

3. The apparatus of claim 1, wherein the processor or memory circuitry comprises a processor, and the plurality of functional units comprises a plurality of processing cores, wherein the processing circuitry of the apparatus is to:
    based on the indication that the processor is receiving electrical power from the AC power source, selectively cause operational electrical power to be provided to the first number of the processing cores; and based on an indication that the processor is receiving electrical power from the battery, selectively cause operational electrical power to be provided to the second number of the processing cores.

4. The apparatus of claim 3, wherein the processor comprises any one of: a central processing unit (CPU); a graphics processing unit (GPU); an image processing unit; a digital signal processing unit; and a data processing unit.

5. The apparatus of claim 3, wherein the processing cores of the plurality of processing cores are operable to execute instructions in parallel from a common workload.

6. The apparatus of claim 1, wherein the processor or memory circuitry comprises a memory circuitry and the plurality of functional units comprises a plurality of memory units, wherein the processing circuitry of the apparatus is to: based on the indication that the memory circuitry is receiving electrical power from the AC power source, selectively cause electrical power to be provided to the first number of the memory units; and based on an indication that the memory circuitry is receiving electrical power from the battery, selectively cause electrical power to be provided to the second number of the memory units.

7. The apparatus of claim 6, wherein the memory circuitry is an embedded memory of a discrete graphics processing unit (GPU).

8. The apparatus of claim 1, wherein a value of the second number is determined based on an indication of a capacity or a charge state of the battery.

9. The apparatus of claim 1, wherein a product of the second number and a clock frequency provided to the second number of functional units is greater than a product of the first number and a maximum clock frequency for the first number of the functional units, the maximum clock frequency for the first number of the functional units being based on a power budget for the processor or memory circuitry when the processor or memory circuitry is receiving electrical power from the battery.

10. The apparatus of claim 1, wherein the processing circuitry of the apparatus is to:
based on the indication that the processor or memory circuitry is receiving electrical power from the battery and based on an indication that a charge state of the battery is less than or equal to a predetermined threshold, selectively cause operational electrical power to be provided to a third number of the functional units of the processor or memory circuitry, the third number being less than the second number.

11. The apparatus of claim 1, wherein to selectively cause operational electrical power to be provided to the first number of the functional units and to selectively cause operational electrical power to be provided to the second number of the functional units, the processing circuitry of the apparatus is to:
selectively control one or more gates configured to control power delivery to the respective functional units of the processor or memory circuitry.

12. The apparatus of claim 1, wherein to selectively cause operational electrical power to be provided to the second number of the functional units, the processing circuitry of the apparatus is to:
disable a provision of a supply voltage to at least a subset of the first number of the functional units; or
disable one or more portions of infrastructural circuitry of the processor or memory circuitry, the one or more portions of the infrastructural circuitry being operably coupled to at least a subset of the first number of the functional units; or
disable provision of a clock signal to at least a subset of the first number of the functional units.

13. A method comprising:
based on an indication that processor or memory circuitry is receiving electrical power from an AC power source, selectively causing operational electrical power to be provided to a first number of a plurality of functional units of the processor or memory circuitry; and
based on an indication that the processor or memory circuitry is receiving electrical power from a battery;
selectively causing operational electrical power to be provided to a second number of the plurality of functional units of the processor or memory circuitry, the second number being less than the first number, wherein by the second number being less than the first number, one or both of a static power consumption and an infrastructural power consumption of the processor or memory circuitry is reduced when the processor or memory circuitry is receiving electrical power from the battery, and
improving performance based on using at least part of a power saved by the one or both of the reduced static power consumption and the reduced infrastructural power consumption to provide electrical power to the second number of the plurality of functional units.

14. The method of claim 13, wherein a value of the second number is determined based on a capacity or a charge state of the battery.

15. One or more non-transitory computer readable media comprising machine readable instructions which, when executed, perform a method comprising:
based on an indication that processor or memory circuitry is receiving electrical power from an AC power source, selectively causing operational electrical power to be provided to a first number of a plurality of functional units of the processor or memory circuitry; and
based on an indication that the processor or memory circuitry is receiving electrical power from a battery;
selectively causing operational electrical power to be provided to a second number of the plurality of functional units of the processor or memory circuitry, the second number being less than the first number, wherein by the second number being less than the first number, one or both of a static power consumption and an infrastructural power consumption of the processor or memory circuitry is reduced when the processor or memory circuitry is receiving electrical power from the battery, and
improving performance is based on using at least part of a power saved by the one or both of the reduced static power consumption and the reduced infrastructural power consumption to provide electrical power to the second number of the plurality of functional units.

16. The one or more non-transitory computer readable media of claim 15, wherein a value of the second number is determined based on an indication of a capacity or a charge state of the battery.

* * * * *